US010552300B2

(12) United States Patent
Kuhn et al.

(10) Patent No.: US 10,552,300 B2
(45) Date of Patent: Feb. 4, 2020

(54) ORACLE-FREE MATCH TESTING OF A PROGRAM USING COVERING ARRAYS AND EQUIVALENCE CLASSES

(71) Applicant: NATIONAL INSTITUTE OF STANDARDS AND TECHNOLOGY, Gaithersburg, MD (US)

(72) Inventors: D. Richard Kuhn, Columbia, MD (US); Raghu N. Kacker, North Potomac, MD (US)

(73) Assignee: UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 512 days.

(21) Appl. No.: 15/019,448

(22) Filed: Feb. 9, 2016

(65) Prior Publication Data

US 2016/0299836 A1 Oct. 13, 2016

Related U.S. Application Data

(60) Provisional application No. 62/144,187, filed on Apr. 7, 2015.

(51) Int. Cl.
G06F 11/36 (2006.01)

(52) U.S. Cl.
CPC ...... *G06F 11/3676* (2013.01); *G06F 11/3692* (2013.01)

(58) Field of Classification Search
CPC .................. G06F 11/3676; G06F 11/3692
See application file for complete search history.

(56) References Cited

U.S. PATENT DOCUMENTS

| 5,142,681 A * | 8/1992 | Driscoll ............... G06F 8/41 717/141 |
| 8,453,115 B2 | 5/2013 | Murray et al. |
| 2003/0208744 A1* | 11/2003 | Amir ................... G06F 11/3684 717/124 |

(Continued)

OTHER PUBLICATIONS

NIST, "An Introduction to Covering Arrays", Apr. 17, 2008, NIST. gov (Year: 2008).*

*Primary Examiner* — Wei Y Zhen
*Assistant Examiner* — Amir Soltanzadeh
(74) *Attorney, Agent, or Firm* — Office of Chief Counsel for National Institute of Standards and Technology

(57) ABSTRACT

A process for testing a program includes: receiving a variable comprising a plurality of input values; producing a plurality of equivalence classes for the input values; producing a representative value per equivalence class; producing, by a processor, a primary covering array comprising a plurality of primary vectors; producing a secondary covering array comprising a plurality of secondary vectors; providing the secondary vectors to the program; and producing a result vector comprising a plurality of result entries to test the program. A computer system for testing the program includes: a memory; and a processor, in communication with the memory, wherein the computer system is configured to perform the process for testing the program. A computer program product for testing the program includes: a non-transitory computer readable storage medium readable by a processor and storing program code for execution by the processor to perform the process.

20 Claims, 16 Drawing Sheets

(56) References Cited

U.S. PATENT DOCUMENTS

2008/0046791 A1* 2/2008 Bicheno .............. G06F 11/3688
 714/742
2012/0167059 A1* 6/2012 Kosuda ............... G06F 11/3676
 717/131

* cited by examiner

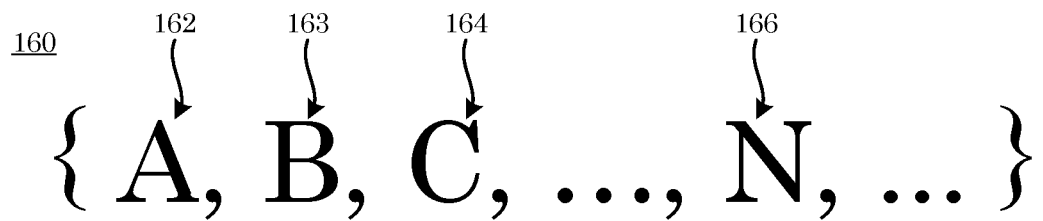
FIG. 3
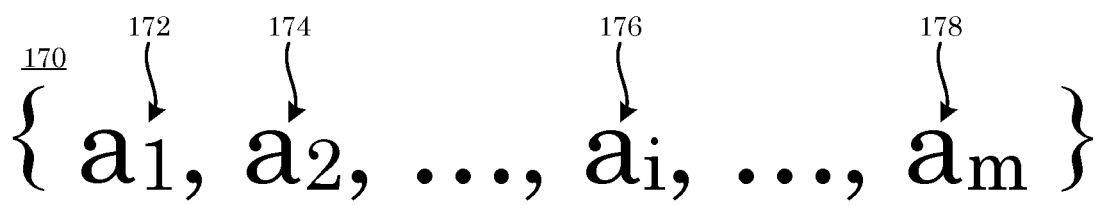
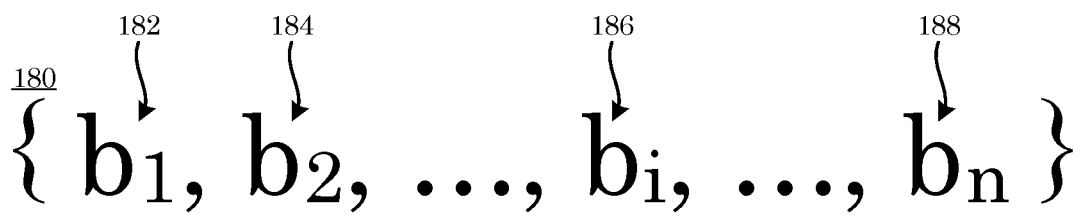
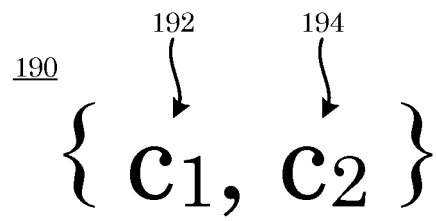
FIG. 4

```
#include <stdio.h>
static int START = 0540;
static int END = 1020;
static int MON = 2;
static int FRI = 6;
int emp;  // employee
int d;    // day, 1..7
int t;    // time, minutes
int p;    // priv
int aud;  // auditor main(argc, argv)
int argc;
char *argv[];
{
   if(argc < 6) {fprintf(stdout, "Error: Command line arguments are\n"); exit(1); }
   emp = atoi(argv[1]);
   d = atoi(argv[2]);
   t = atoi(argv[3]);
   p = atoi(argv[4]);
   aud = atoi(argv[5]);
   fprintf(stdout, "%d\n", access_chk());
} int access_chk() {
  if (emp && t >= START && t <= END &&
  d >= MON && d <= FRI) return 1;
  else
  if (emp && p) return 2;
  else
  if (aud && d >= MON && d <= FRI)
  return 3;
  else
  return 0;
}
```

FIG. 22

ORACLE-FREE MATCH TESTING OF A PROGRAM USING COVERING ARRAYS AND EQUIVALENCE CLASSES

CROSS REFERENCE TO RELATED APPLICATIONS

This application claims the benefit of U.S. Provisional Patent Application Ser. No. 62/144,187, filed Apr. 7, 2015, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a process for testing a program, the process comprising: receiving a variable comprising a plurality of input values; producing a plurality of equivalence classes for the input values; producing a representative value per equivalence class; producing, by a processor, a primary covering array comprising a plurality of primary vectors; producing a secondary covering array comprising a plurality of secondary vectors; providing the secondary vectors to the program; and producing a result vector comprising a plurality of result entries to test the program.

Further disclosed is a computer system for testing a program, the computer system comprising: a memory; and a processor, in communications with the memory, wherein the computer system is configured to perform: receiving a variable comprising a plurality of input values; producing a plurality of equivalence classes for the input values; producing a representative value per equivalence class; producing, by the processor, a primary covering array comprising a plurality of primary vectors; producing a secondary covering array comprising a plurality of secondary vectors; providing the secondary vectors to the program; and producing a result vector comprising a plurality of result entries to test the program.

Additionally disclosed is a computer program product for testing a program, the computer program product comprising: a non-transitory computer readable storage medium readable by a processor and storing program code for execution by the processor to perform a process comprising: receiving a variable comprising a plurality of input values; producing a plurality of equivalence classes for the input values; producing a representative value per equivalence class; producing, by the processor, a primary covering array comprising a plurality of primary vectors; producing a secondary covering array comprising a plurality of secondary vectors; providing the secondary vectors to the program; and producing a result vector comprising a plurality of result entries to test the program.

BRIEF DESCRIPTION OF THE DRAWINGS

The following descriptions should not be considered limiting in any way. With reference to the accompanying drawings, like elements are numbered alike.

FIG. 3 shows a plurality of variables;
FIG. 4 shows a plurality of input values;
FIG. 22 shows a code for a control system according to Example 1.

DETAILED DESCRIPTION

A detailed description of one or more embodiments is presented herein by way of exemplification and not limitation.

It has been discovered that a process herein tests computer software or provides control of or a determination of a parameter for physical articles (e.g., avoidance of collisions between vehicles, control of exposure time on a camera, position of a robot arm, velocity of a conveyor belt, and the like). Advantageously, the process tests computer software or a condition that includes a complex condition or a decision in an environment such as process control, manufacturing, avionics, and the like. In a certain embodiment, a process includes verifying equivalence classes for testing a module or unit. Testing or equivalence class verification includes, e.g., providing a two-layer covering array in which a value of a primary covering array includes an equivalence class. A secondary covering array of equivalence class values is determined, and representative values of the equivalence class are provided in the secondary array. The process further includes detecting an error (as used herein, an error is also called fault or bug in the program) in an absence of a test oracle. In some embodiments, the process includes verifying equivalence classes for testing the program that includes using a two-layer covering array (e.g., the primary covering array and the secondary covering array) in which an entry of the primary covering array is an equivalence classes. The secondary covering array is determined, and a result vector is computed from the secondary covering array, wherein result entries in the result vector are analyzed for self-consistency to determine whether an error is present in the program or equivalence classes. This determination is accomplished done in absence of a test oracle.

As used herein, "equivalence class" refers to a set of input of a variable value for which the program under test has the same result.

Accordingly, in an absence of an error, a first representative value from an equivalence class and a second representative value from the equivalence class produce an identical result from the program. If the result produced by the program is different for the first representative value and that for the second representative value, then an error is present wherein the input values of the variable were partitioned incorrectly to produce the equivalence classes or the code of the program includes the error.

Figure 1:
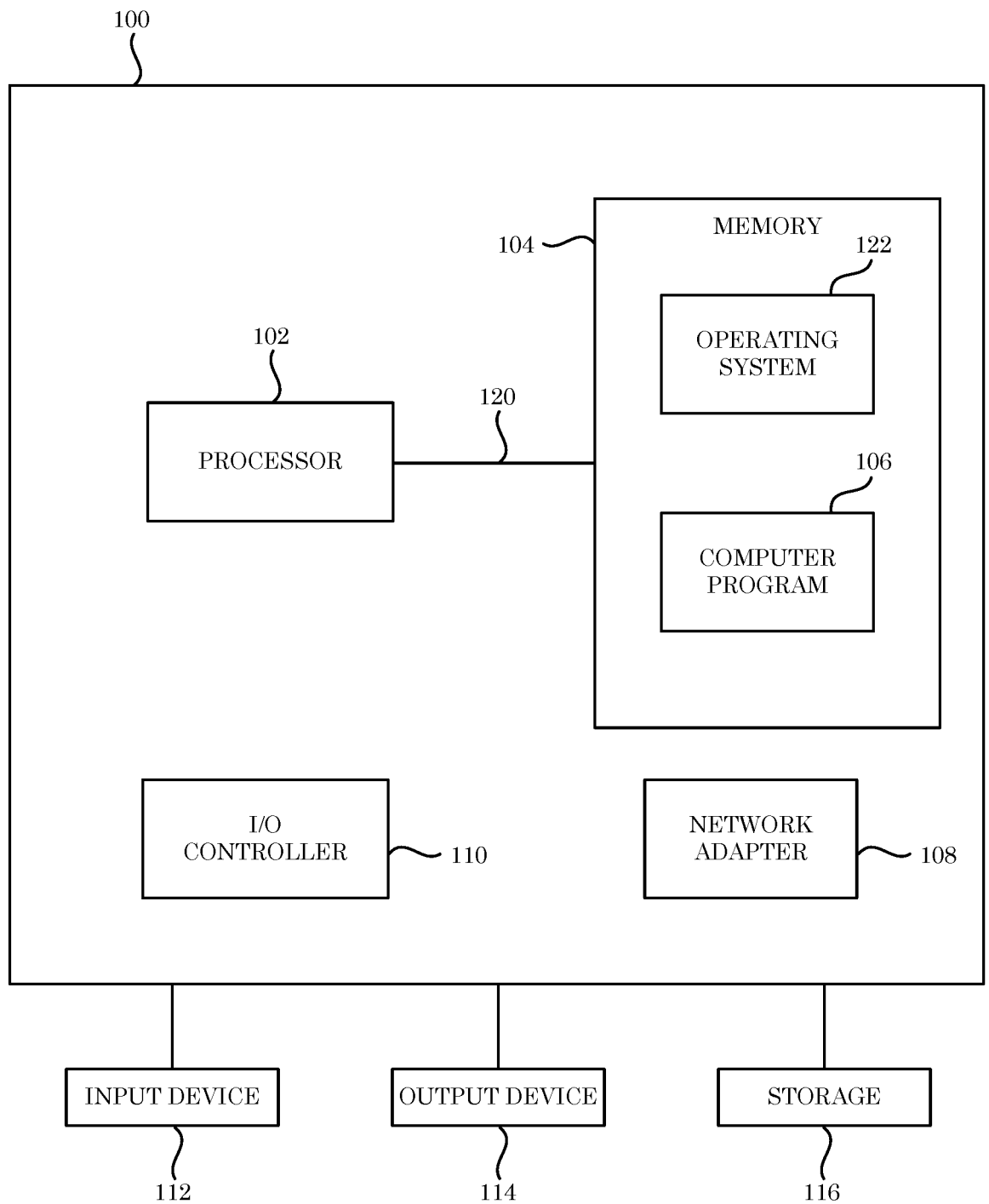
FIG. 1 shows a data processing system.

In an embodiment, with reference to FIG. 1, data processing system 100 incorporates and uses a process for testing a program. Data processing system 100 can be based on a computer architecture such as a server, workstation, information appliance, embedded computer, minicomputer, microcomputer, mainframe computer, supercomputer, networked computer, laptop, tablet, smartphone, and the like. Exemplary computer architecture include architectures offered commercially (e.g., XSERIES or ISERIES by International Business Machines Corporation (XSERIES AND ISERIES are registered trademarks of International Business Machines Corporation, Armonk, N.Y.), Intel Corporation's x86 architecture, and the like.

Data processing system 100 stores or executes the program. As used herein, "program" includes executable code, data, system configuration files, machine environment state settings, or the like. Here, data processing system 100 includes processor 102 coupled (directly or indirectly) to memory 104 through, e.g., system bus 120. In operation, processor 102 receives from memory 104 an instruction for execution by processor 102. Memory 104 can include local memory employed during execution of the program, bulk storage, or cache memory to provide temporary storage of some program code to reduce a number of times code is retrieved from bulk storage during program execution. Exemplary types of memory 104 include a hard disk, random access memory (RAM), read-only memory (ROM), erasable programmable read-only memory (EPROM or flash memory), optical fiber, portable compact disc read-only memory (CD-ROM), optical storage device, magnetic storage device, or a combination thereof. Memory 104 includes operating system 122 and program 106.

According to an embodiment, input/output (I/O) devices 112, 114 (e.g., a keyboard, display, pointing device, and the like) are coupled to date processing system 100 directly or through I/O controller 110.

Network adapter 108 is included in data processing system 100 to couple it to a second data processing system or a remote printer or storage device through an intervening private or public network. Exemplary network adapters 108 include a modem, cable modem, Ethernet card, and the like.

Data processing system 100 can be coupled to storage 116 (e.g., a non-volatile storage area such as a magnetic disk drive, optical disk drive, tape drive, and the like) that includes a database. Storage 116 can include an internal storage device or an attached or network accessible storage. A computer program in storage 116 can be loaded into memory 104 and executed by processor 102.

Data processing system 100 can include fewer components than shown in FIG. 1, additional components not shown, or a combination of components shown and an additional component. Data processing system 100 may include a computing device known in the art, such as a mainframe, server, personal computer, workstation, laptop, handheld computer, telephony device, network appliance, virtualization device, storage controller, and the like.

Figure 2:
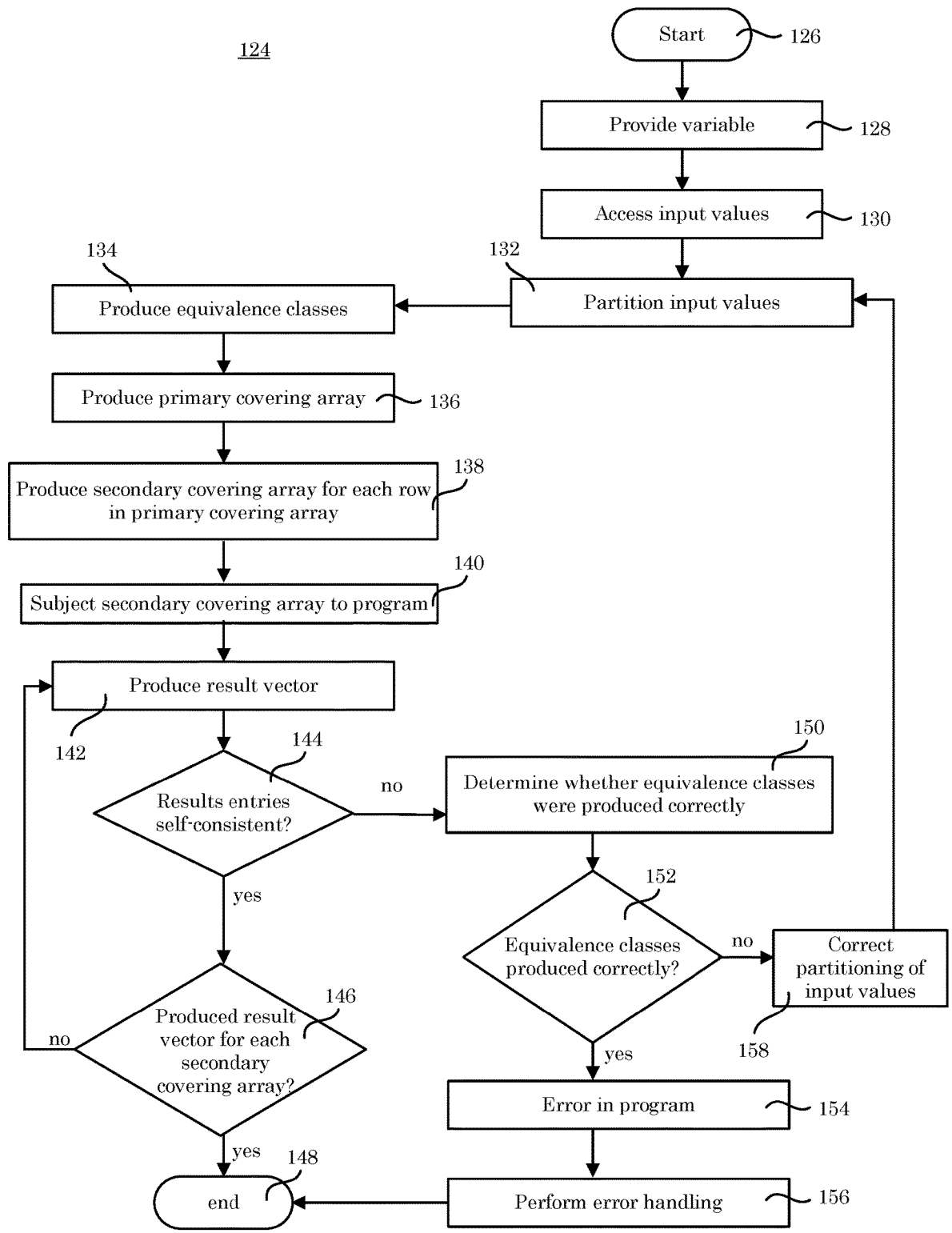
FIG. 2 shows a flowchart.

According to an embodiment, with reference to the flowchart shown in FIG. 2, data processing system 100 executes program 106 as part of process 124 for testing program 106. Here, process 124 starts (step 126) by receiving (e.g., by processor 102 or memory 104) a variable (step 128) that includes a plurality of input values, accessing the input values (step 130) (e.g., by processor 102), partitioning the input values (step 132), producing equivalence classes from the partitioned input values (step 134), producing a primary covering array (step 136) (that includes a primary vector having a primary entry), producing a secondary covering array (that includes a secondary vector having a secondary entry) for each role in the primary covering array (step 138), subjecting each secondary covering array to the program 106 (step 140), producing from program 106 a result vector for each secondary covering array (step 142), and determining whether result entries in the result vector are self-consistent (step 144).

If the result entries in the result vector are self-consistent (at step 144), the process includes determining whether a result vector was produced for each secondary covering array (step 146). If a result vector was produced for every secondary covering array (at step 146), then the process ends (step 140). If a result vector (having a plurality of result entries) was not produced for every secondary covering array (at step 146), then the process reiterates to produce in other result vector (step 142).

If the result entries in the result vector are not self-consistent (at step 144), the process includes determining whether equivalence classes were produced correctly (step 150). If equivalence classes were produced correctly (step 152), process 124 determines program 106 includes error in code (step 154), and process 124 includes error handling (step 156) such as producing an error flag, error message, error alarm, and the like. If equivalence classes were not produced correctly (step 152), process 124 includes correcting partitioning of input values (step 158) and repartitioning the input values (step 132) by applying a corrected partitioning rule.

In an embodiment, the program is tested against input values that are partitioned into the equivalence classes. In a particular embodiment, representative values from each equivalence class is provided to the program, and the output the program is stored, e.g., in memory 104, as a result vector. It is contemplated that the program can be executable code (including units, modules, scripts, and the like), data, system configuration files, machine environment state settings, and the like. In a certain embodiment, the program is executable program that receives the representative values as a substitute for the input values of the variable, which is the expected input by the program.

The program operates on the variable and is configured to accept an input value of the variable. With reference to FIG. 3, a plurality of variables (160) includes, e.g., first variable 162, second variable 163, third variable 164, and the like, such as arbitrary variable 166. Variables 160 are a data type acceptable to the program. Exemplary data types include integer, real numbers, floating point, Boolean, strings, characters, data structures, and the like. Exemplary variables include both discrete and continuous types, including integers, real numbers, floating points, and other defined data types within the program.

The program accepts the input value of variable 160. As shown in FIG. 4, first variable 162 includes a plurality of input values 170 that includes first input value 172, second input value 174, arbitrary input value 176, and final input value 178. With regard to first input value 172 (shown as "$a_1$"), main member 171 is a lowercase letter indicating first input value 172 corresponds to first variable 162 (shown as "A" in FIG. 3), and subscript member 173 is a subscript that indexes input values 170 (i.e., 172, 174, 176, 178, and the like). It is contemplated that a data type of input values 170 is the same as the data type of variable 160 (particularly first variable 162). Exemplary input values include both discrete and continuous types, including integers, reals, and other defined data types within the program.

The number of input values is countable or uncountable. The number of input values can be finite or infinite. In an embodiment, second variable 163 includes a plurality of input values 180 that includes first input value 182, second input value 184, arbitrary input value 186, and final input value 188. In some embodiments, third variable 164 includes a plurality of input values 190 (e.g., two input values) that includes first input value 192 and second input value 194.

Figure 5:
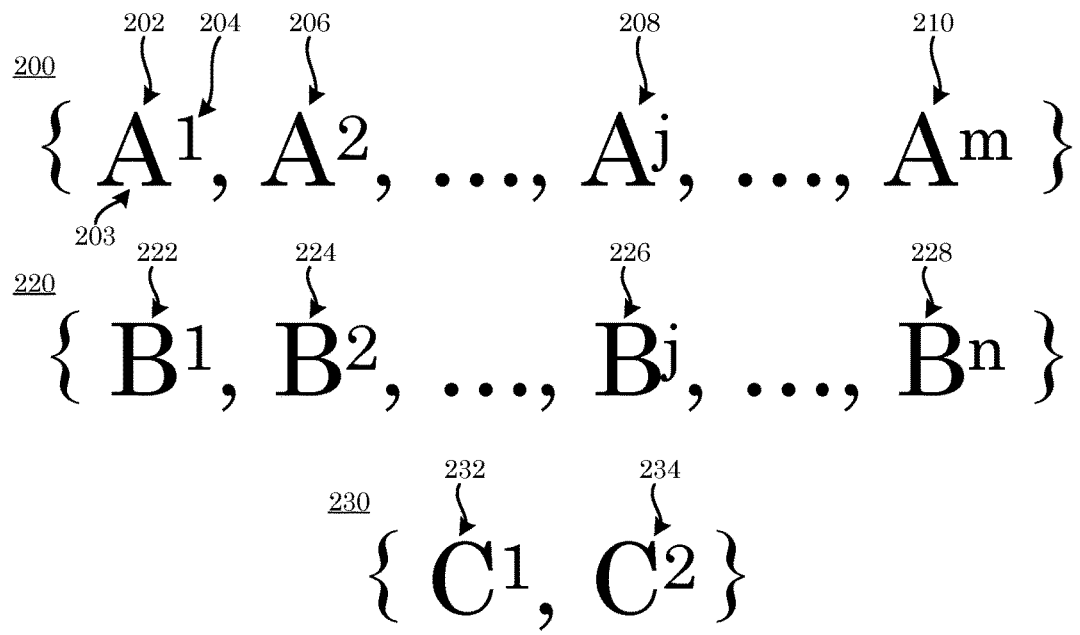
FIG. 5 shows a plurality of equivalence classes.

Input Values (e.g., 170, 180, 190) of variables 160 are partitioned into a plurality of partitioned input values (see FIG. 6, FIG. 7, and FIG. 8) to provide equivalence classes such as shown in FIG. 5. Here, input values 170 of first variable 162 are partitioned into a plurality of equivalence classes 200 that includes first equivalence class 202, second equivalence class 206, arbitrary equivalence class 208, and final equivalence class 210. With regard to first equivalence class 202 (shown as "$A^1$"), main member 203 is an uppercase letter indicating first equivalence class 202 corresponds to first variable 162 (shown as "A" in FIG. 3"), and superscript member 204 is a superscript that indexes equivalence classes 200 (i.e., 202, 206, 208, 210, and the like).

In an embodiment, second variable 163 is partitioned into a plurality of equivalence classes 220 that includes first equivalence class 222, second equivalence class 224, arbitrary equivalence class 226, and final equivalence class 228. In some embodiments, third variable 164 is partitioned into a plurality of equivalence classes 230 (e.g., two equivalence classes) that includes first equivalence class 232 and second equivalence class 234.

Figure 6:
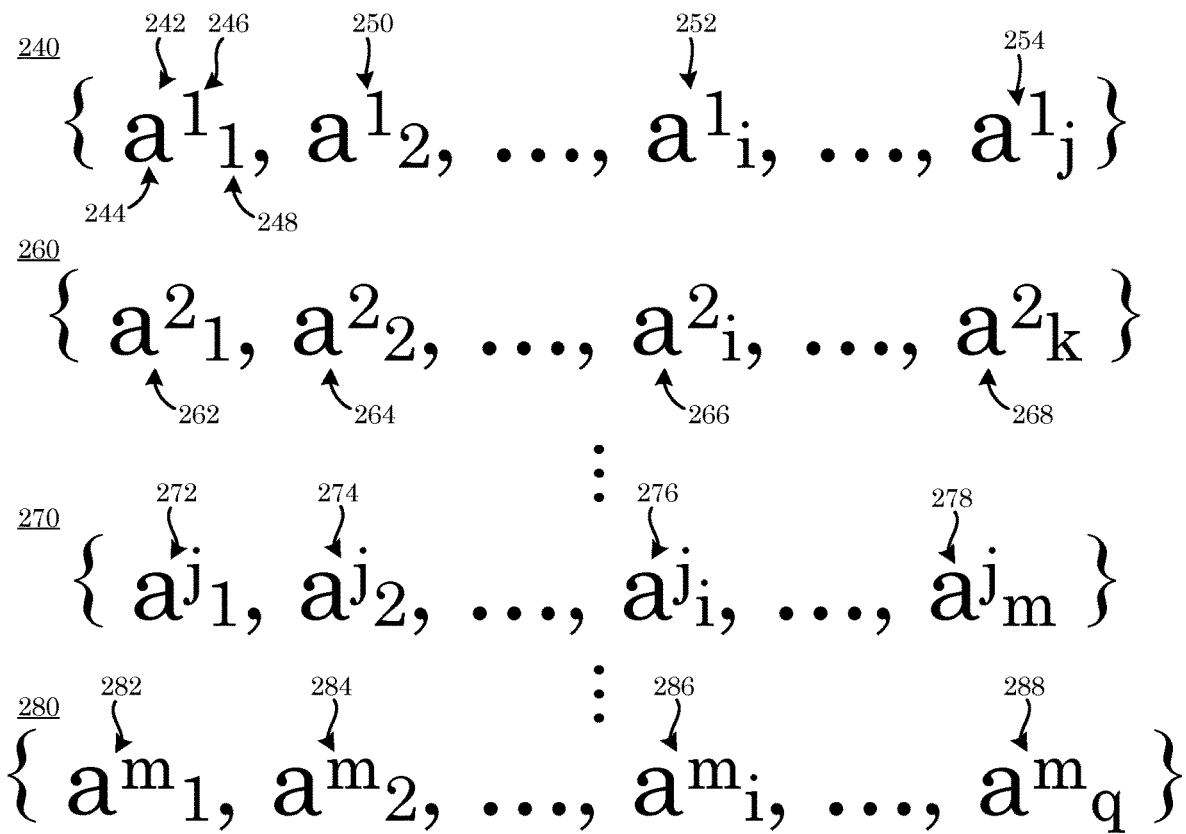
FIG. 6 shows a plurality of partitioned values.
Figure 7:
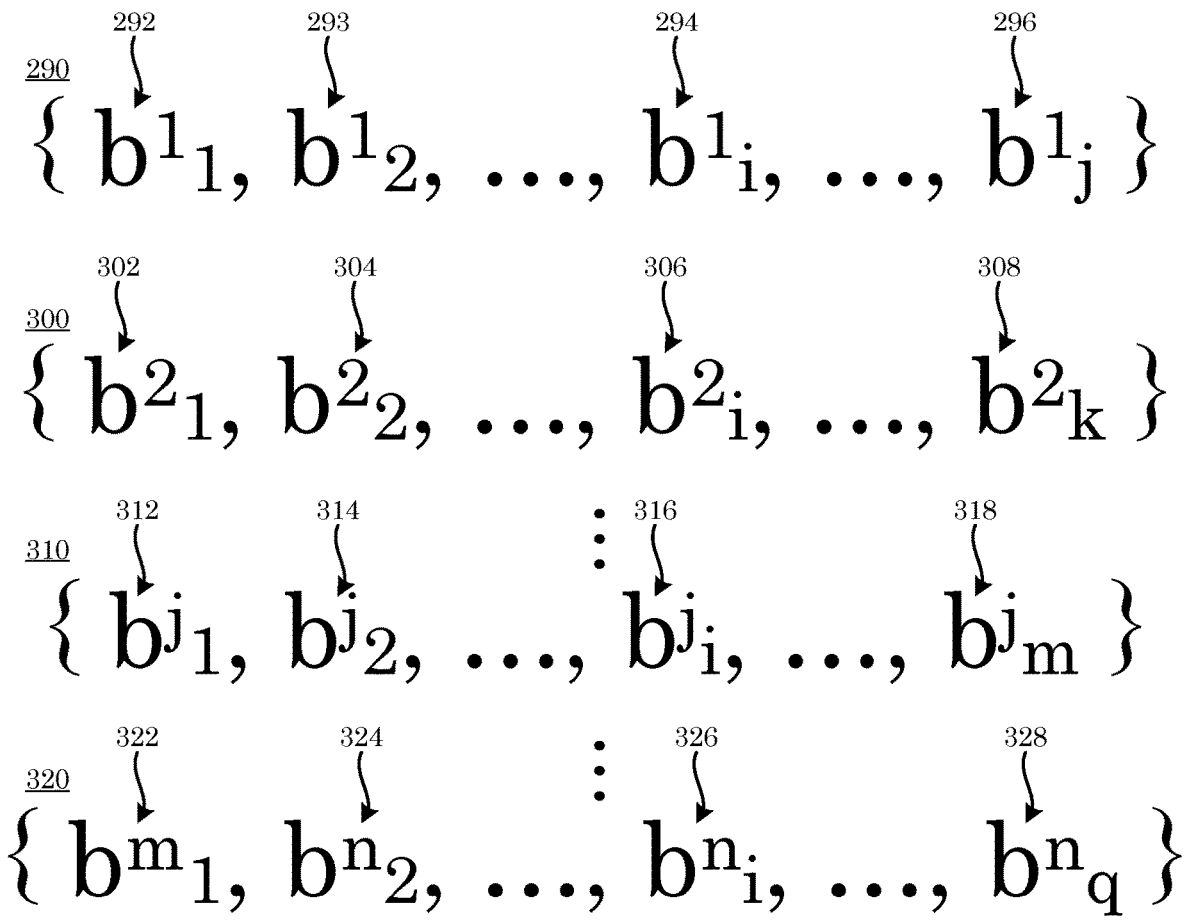
FIG. 7 shows a plurality of partitioned values.
Figure 8:
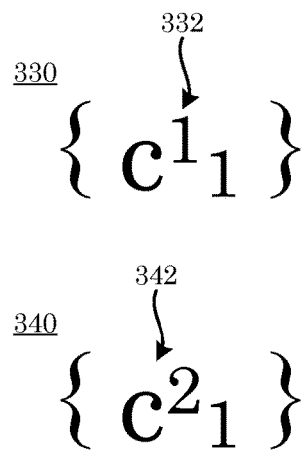
FIG. 8 shows a plurality of partitioned values.

With reference to FIG. 6, FIG. 7, and FIG. 8, input values of the variables are partitioned into partitioned values. Here, as shown in FIG. 6, first input values 170 of first variable 162 are partitioned into a plurality of partitioned values (e.g., first partitioned values 240, second partitioned values 260, arbitrary partitioned values 270, final partitioned values 280). First partitioned values 240 of first equivalence class 202 (i.e., $A^1$) include partitioned members (242, 250, 252, 254), wherein first partitioned member 242 includes main member 244 (representing equivalence classes 200), superscript 246 (representing first equivalence class 202 (i.e., $A^1$)), and subscript 248 (which indexes individual first partitioned values 240). Second partitioned values 260 of second equivalence class 206 include partitioned members (262, 264, 266, 268). Arbitrary partitioned values 270 of arbitrary equivalence class 208 ($A^j$) include partitioned members (272, 274, 276, 278), and final partitioned values 280 of final equivalence class 210 ($A^m$) include partitioned members (282, 284, 286, 288).

As shown in FIG. 7, input values 180 of second variable 163 are partitioned into a plurality of partitioned values (e.g., first partitioned values 290, second partitioned values 300, arbitrary partitioned values 310, final partitioned values 320). First partitioned values 290 of equivalence class 222 (i.e., $B^1$) include partitioned members (292, 293, 294, 296). Second partitioned values 300 of equivalence class 224 include partitioned members (302, 304, 306, 308). Arbitrary partitioned values 310 of arbitrary equivalence class 226 ($B^j$) include partitioned members (312, 314, 316, 318), and final partitioned values 320 of final equivalence class 228 ($B^n$) include partitioned members (322, 324, 326, 328).

It is contemplated that a number of partitioned values can be any number such as greater than or equal to one. As shown in FIG. 8, input values 190 of third variable 164 are partitioned into a plurality of partitioned values (e.g., first partitioned value 330, second partitioned values 340). First partitioned value 330 of equivalence class 232 (i.e., $C^1$) includes partitioned member 332, and second partitioned value 340 of equivalence class 234 includes partitioned member 342.

Figure 9:
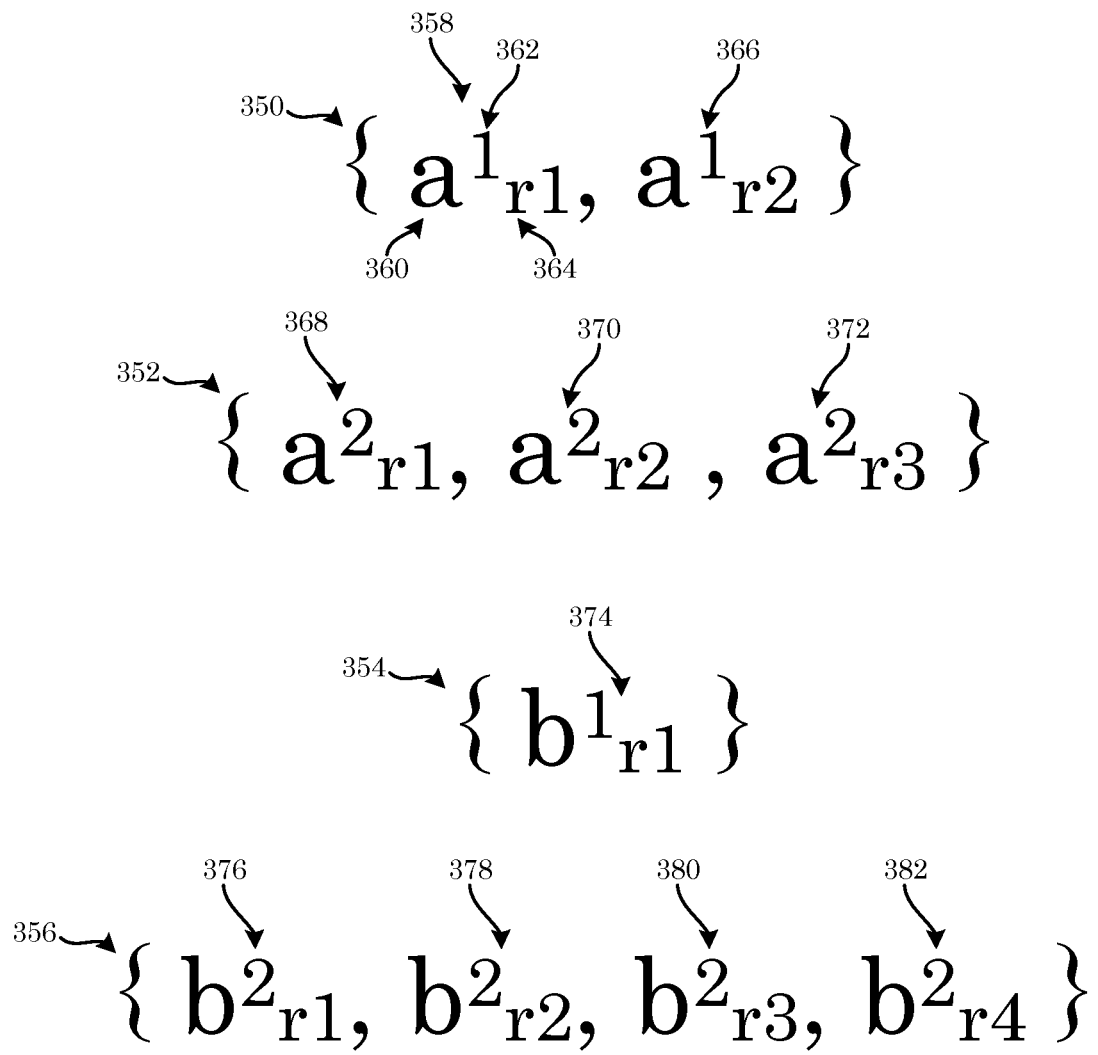
FIG. 9 shows a plurality of representatives values.

In an embodiment, with reference to FIG. 9, representative values (e.g., 350, 352, 354, 356) for each equivalence class is produced by the process for testing the program from partitioned values (e.g., 240, 260, 270, 280, 290, 300, 310, 320, 330, 340). Here, plurality of first representative values 350 include representative values (358, 366), wherein (e.g., with regard to representative value 358) main member 360 and superscript 362 indicate that representative value 358 corresponds to first equivalence class 202 (i.e., $A^1$), and subscript 364 (i.e., "r1") indexes individual representative values in the set of first representative values 350. Similarly, second representative values 352 include representative values (360, 370, 372). It will be appreciated that a number of representatives values for an equivalence class can be any number effective to test the program so that a set of representatives values can include a single representative value such as third set of representatives values 354 that includes representative value 374 for equivalence class B1 (222—see FIG. 5).

Representative values are used in secondary covering arrays (produced from the primary covering array) that are subjected to testing the program as an input into the program in lieu of the input values (e.g., 170, shown in FIG. 4).

Figure 10:
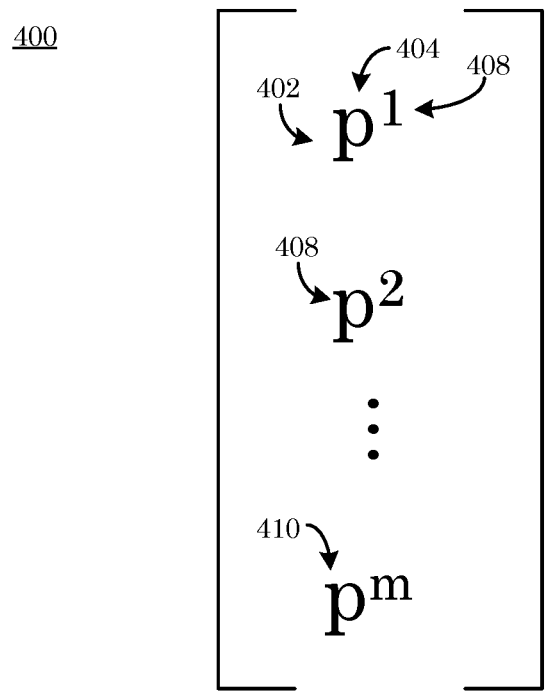
FIG. 10 shows a primary covering array.
Figure 11:
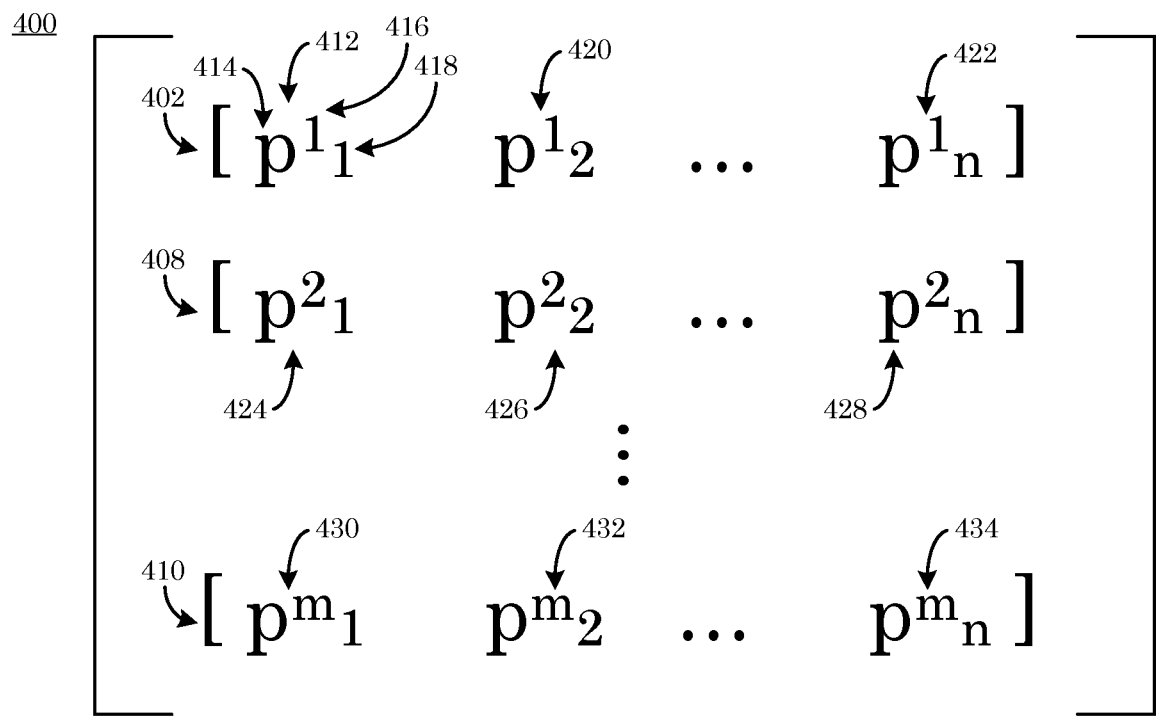
FIG. 11 shows a primary covering array.

With reference to FIG. 10 and FIG. 11, primary covering array 400 includes a plurality of primary vectors (402, 408, 410), which are indicated by member 404 ("p" for primary vector) and superscript 406 (an index for each primary vector). First primary vector 402 includes primary entries (412, 420, 422), wherein first entry 412 is indicated by member 414 and superscript 416 (indicating first entry 412 corresponds to first primary vector 402) and subscript 418 to index primary entries (412, 420, 422). Similarly, second primary vector 408 includes primary entries (424, 426, 428), and final primary vector 410 includes primary entries (430, 432, 434). It will be appreciated that a number of primary vectors in primary array 400 is selected based on the number of different equivalence classes for a variable. In some embodiments, the number of primary vectors in primary array 400 is selected based on the number of combinations of different equivalence classes for a plurality of variables according to an embodiment. Primary entries (e.g., 412, 420, 422, 424, 426, 428, 430, 432, 434, and the like) correspond to an equivalence class or input value for each variable.

Figure 12:
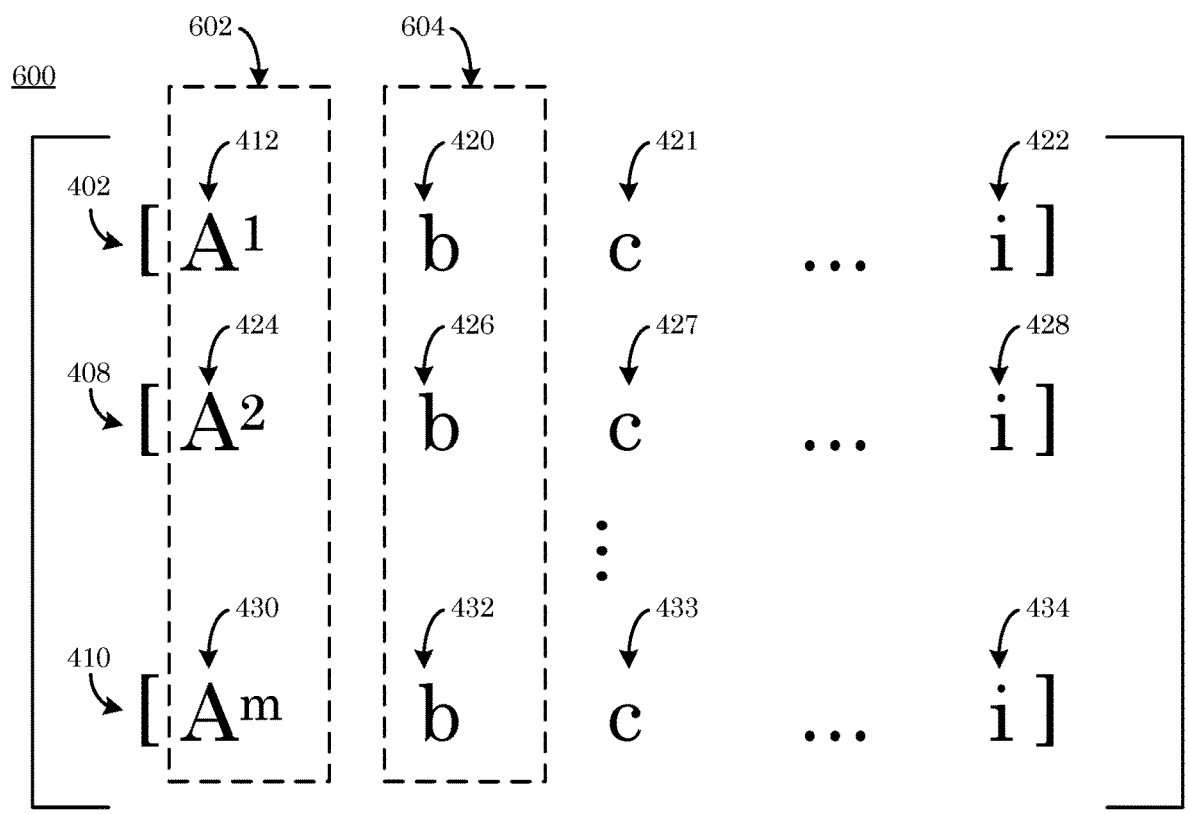
FIG. 12 shows a primary covering array.

According to an embodiment, with reference to FIG. 12, primary covering array 600 includes a plurality of primary vectors (402, 408, 410), wherein primary entries (412, 424, 430) of primary vectors (402, 408, 410) correspond to equivalence classes 200 for first variable 162. Further, primary entries (420, 426, 432) include an input value ("b") for second variable 163 ("B"). Primary entries (421, 427, 433) include an input value ("c") for third variable 164 ("C"). Final primary entries (422, 428, 434) include an input value ("i") for a final variable. As a result, each column of primary covering array 400 corresponds to one of variables 160. Moreover, each primary entry for each primary vector includes either a designation for an equivalence class or an input value for the variable associated with the primary entry. For primary covering array 600 shown in FIG. 12, first column 602 includes primary entries (412, 424, 430) for first equivalence classes 200 of first variable 162, and second column 604 includes primary entries (420, 426, 432) that are an identical input value for second variable 163. Accordingly, primary covering array 600 includes at least one column (e.g., 602) corresponding to a plurality of equivalence classes (e.g., first equivalence classes 200).

Figure 13:
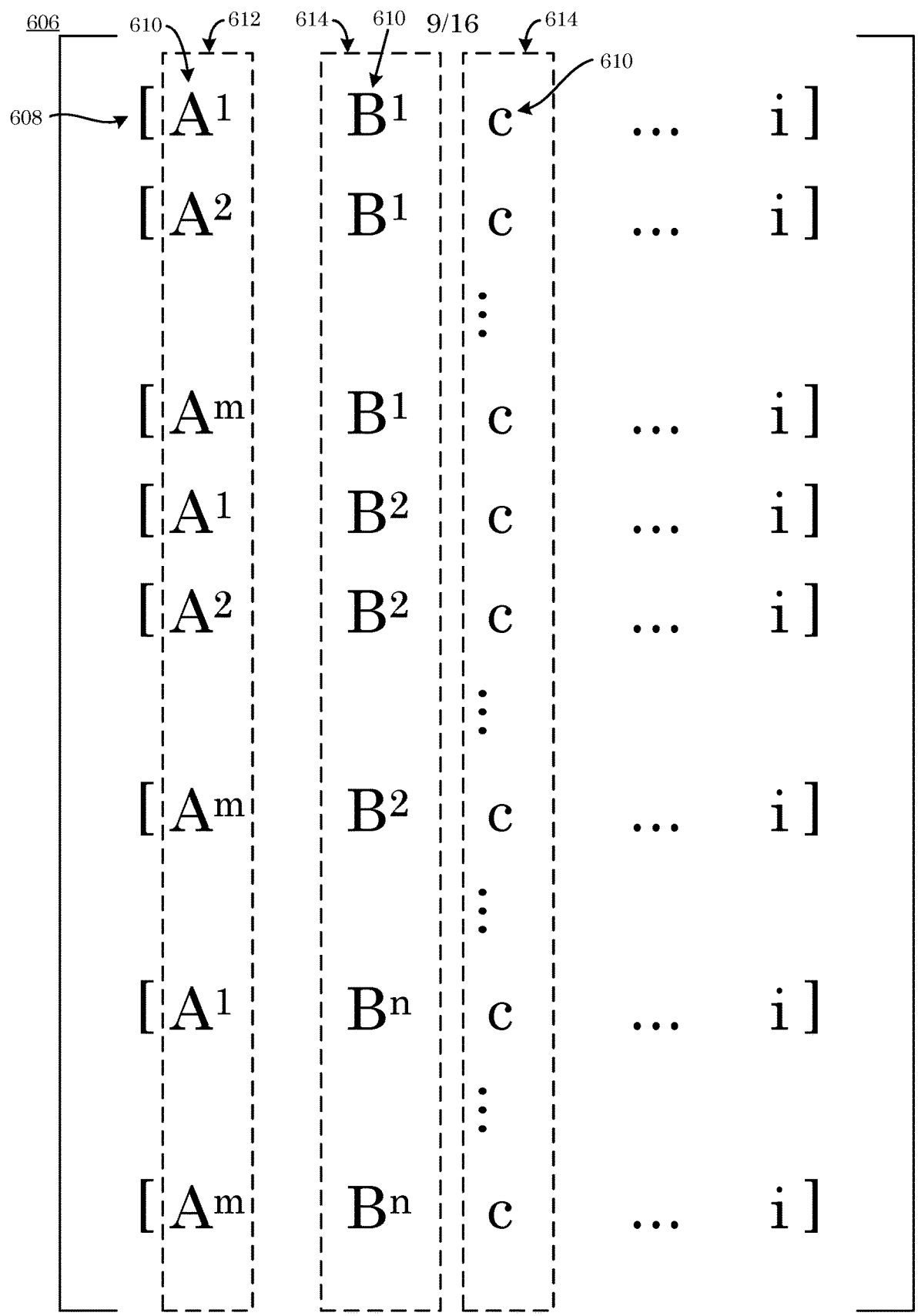
FIG. 13 shows a primary covering array.

In some embodiments, as shown in FIG. 13, primary covering array 606 includes a plurality of primary vectors 608 that includes a plurality of primary entries 610, that can be grouped into a plurality of columns (e.g., 612, 614, 616). Here, first column 612 includes primary entries 610 for equivalence classes 200 for first variable 162, and primary entries 610 for equivalence classes 224, second variable 163. Third column 616 includes primary entries 610 that are an input value for third variable 164.

Figure 14:
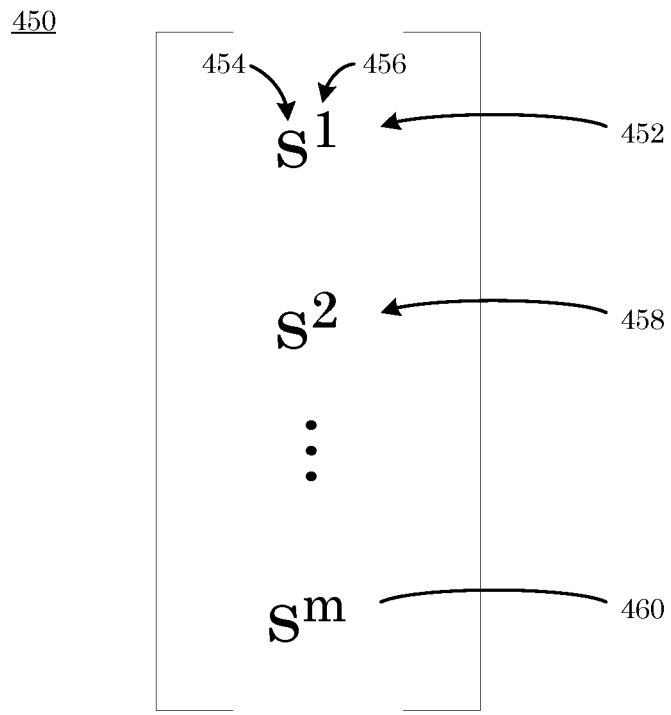
FIG. 14 shows a secondary covering array.
Figure 15:
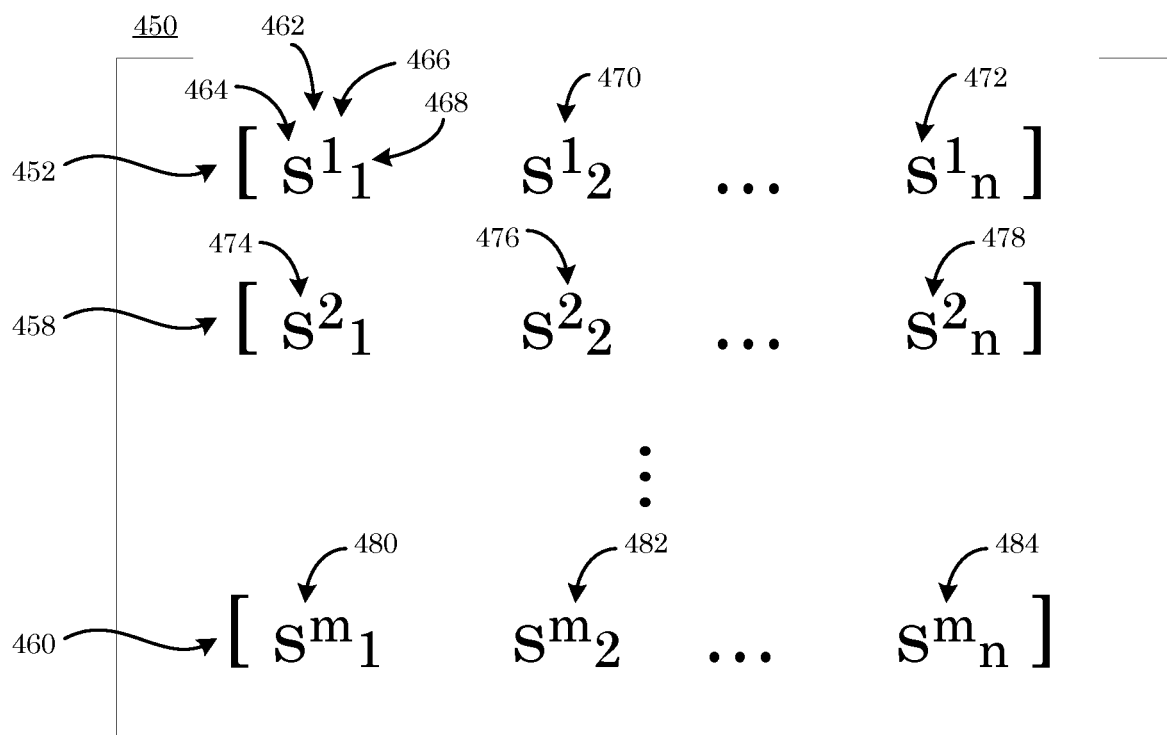
FIG. 15 shows a secondary covering array.

According to an embodiment, primary covering arrays are used to produce secondary covering arrays, wherein a secondary covering array is produced for each primary vector in the primary covering array. With reference to FIG. 14 and FIG. 15, secondary covering array 450 includes a plurality of secondary vectors (452, 458, 460), which are indicated by member 454 ("s" for secondary vector) and superscript 456 (an index for each secondary vector). First secondary vector 452 includes primary entries (462, 470, 472), wherein first entry 462 is indicated by member 464 and superscript 466 (indicating first entry 462 corresponds to first secondary vector 452) and subscript 468 to index secondary entries (462, 470, 472). Similarly, second secondary vector 458 includes secondary entries (474, 476, 478), and final secondary vector 460 includes secondary entries (480, 482, 484). It will be appreciated that a number of secondary vectors in secondary array 450 is selected based on the number of different representative values for equivalence classes of a variable.

Figure 16:
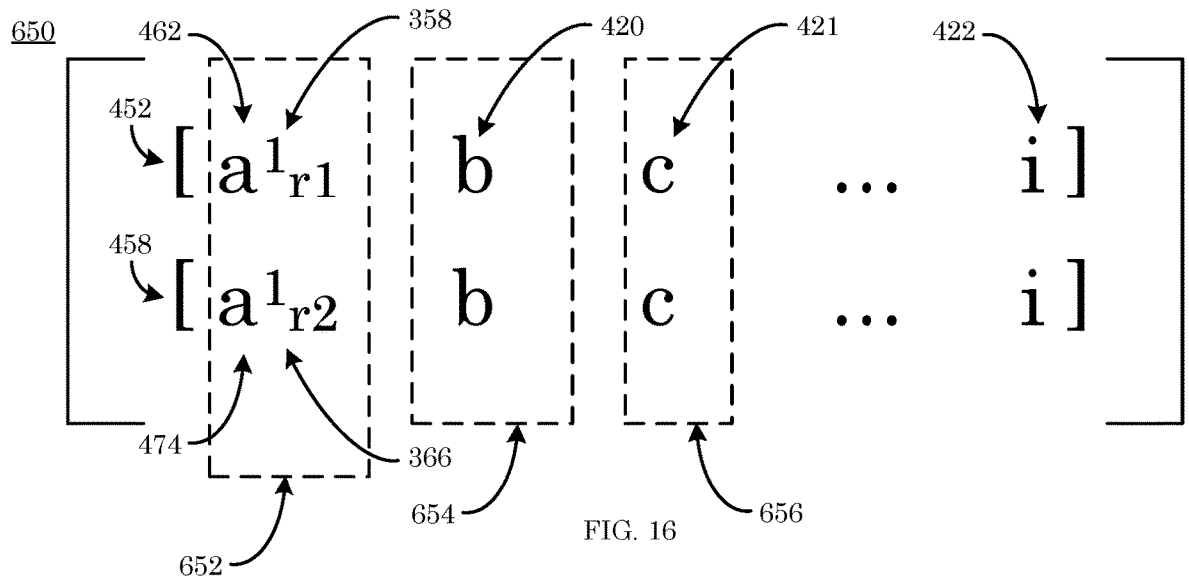
FIG. 16 shows a secondary covering array.

According to an embodiment, with reference to FIG. 16, secondary covering array 650 is produced from first primary vector 402 of primary covering array 600 (e.g., see FIG. 12) and includes first secondary vector 452 and second secondary vector 458 with representative values (358, 366) from first equivalence class 202 as secondary entries (462, 474). That is, first column 652 includes secondary entries (462, 474) for first equivalence class 202 (A') of first variable 162 populated by representative values (358, 366, e.g., see FIG. 9). Second column 654 includes input value 420 for second variable 163, and third column 656 includes input value 421 for third variable 164. The final column of secondary covering array 650 includes input value 422 for the final variable.

Figure 17:
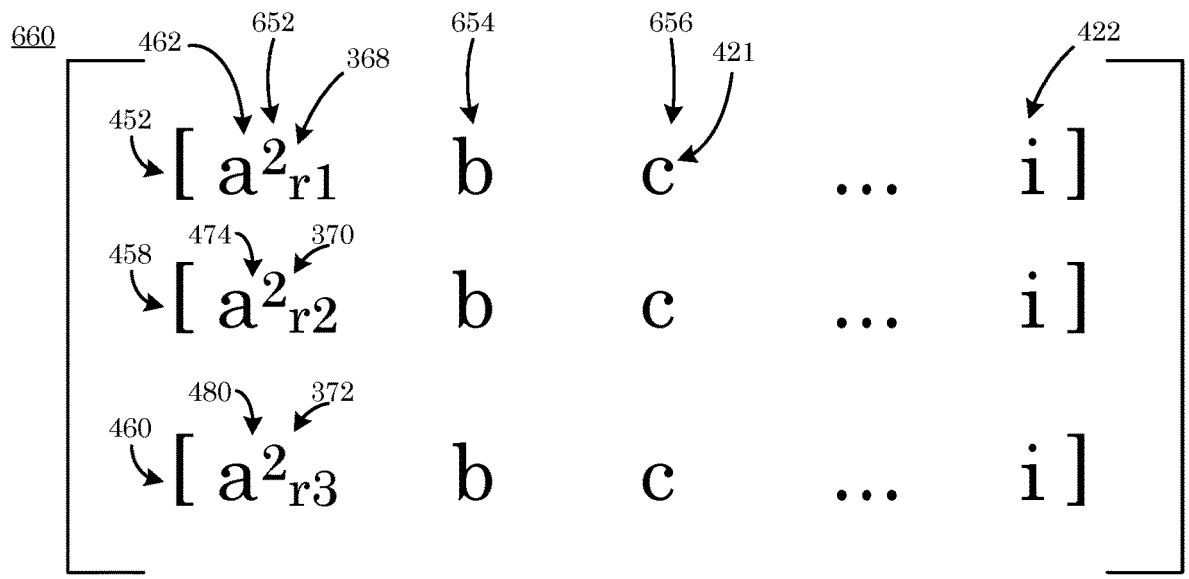
FIG. 17 shows a secondary covering array.

With reference to FIG. 17, secondary covering array 660 is produced from second primary vector 408 of primary covering array 600 (e.g., see FIG. 12) and includes first secondary vector 452, second secondary vector 458, and third secondary vector 460 with representative values (368, 370, 372) from equivalence class 204 as secondary entries (462, 474, 480). That is, first column 652 includes secondary entries (462, 474, 480) for equivalence class 206 ($A^2$) of first variable 162 populated by representative values (368, 370, 372, e.g., see FIG. 9). Second column 654 includes input value 420 for second variable 163, and third column 656 includes input value 421 for third variable 164. The final column of secondary covering array 660 includes input value 422 for the final variable.

Figure 18:
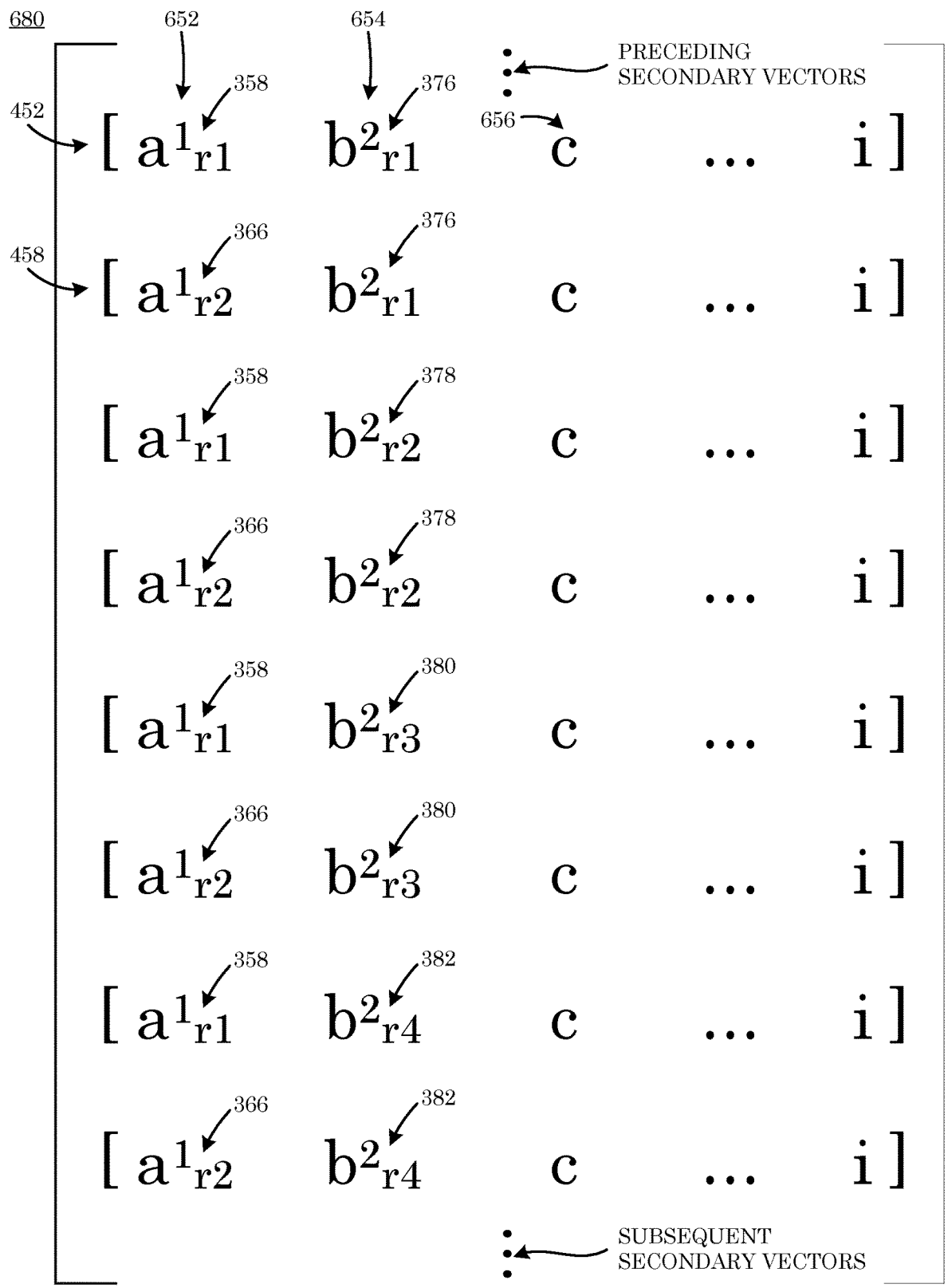
FIG. 18 shows a secondary covering array.

In some embodiments, with reference to FIG. 18, secondary covering array 680 includes a plurality of columns (652, 654) that include representative values as secondary entries. Here, secondary covering array 680 is produced from primary covering array 608 shown in FIG. 13, wherein representative values for first equivalence class 200 and second equivalence classes 220 are included respectively in first column 652 and 654. Although only limited number of representative values (such as 358, 366, 376, 378, 380, 382) is shown explicitly in secondary covering array 680, other secondary vectors are indicated by vertical ellipses in FIG. 18

Figure 19:
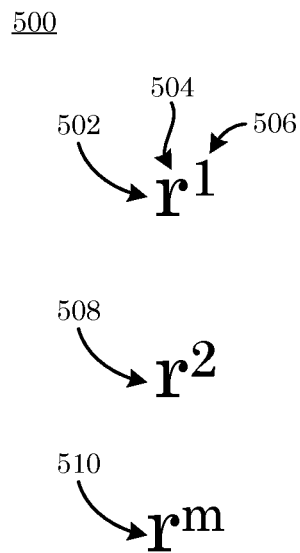
FIG. 19 shows plurality of result vectors.
Figure 20:
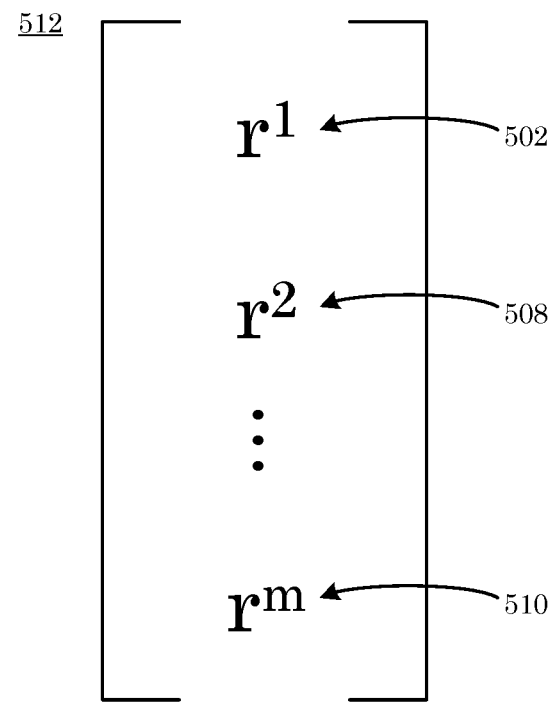
FIG. 20 shows a result array.
Figure 21:
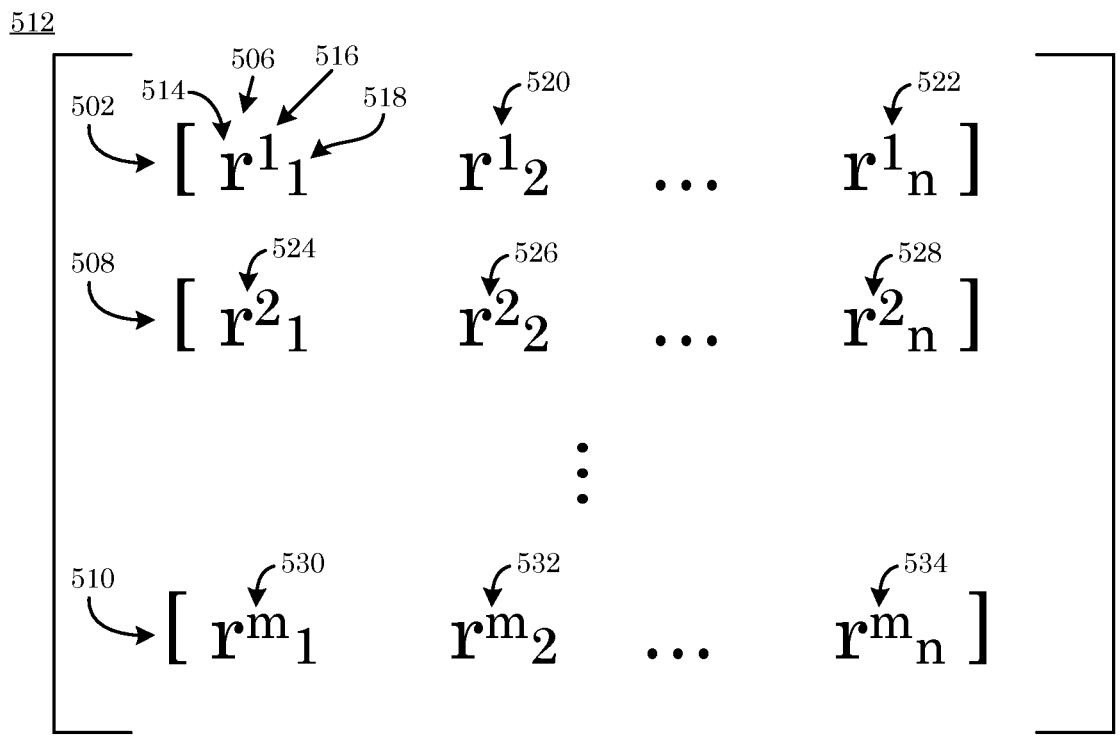
FIG. 21 shows a result array.

Secondary covering arrays are provided to the program to test the program. A result vector is output from the program in response to executing the program using the secondary covering array as an input to the program. FIG. 19 shows a plurality of result vectors 500 that includes first result vector 502, second result vector 508, and final result vector 510. Member 504 is a lowercase letter "r" indicating first result vector 502 is a result vector, and subscript 506 indexes result vectors (502, 508, 510), which can be arranged as result array 512 shown in FIG. 20. Moreover, with reference to FIG. 21, first result vector 502 includes a plurality of result entries (506, 520, 522). Individual result entries (e.g., result entry 506) is an output of testing the program with a secondary vector (having secondary entries). Moreover, result entries (e.g., 506) include member 514 as a lowercase letter "r" indicating result entry 506 is a result entry, superscript 516 to indicate to which result vector result entry 506 corresponds, and subscript 518 to index result entries (506 and the like). Here, first result vector 502 includes result entries (506, 520, 522); second result vector 508 includes result entries (524, 526, 528); and final result vector 510 includes result entries (530, 532, 534). According to an embodiment, result entries (e.g., 506, 520, 522) of a result vector (e.g., first result vector 502) are checked to determine whether result entries (506, 520, 522) are self-consistent, i.e., are identical or within a range of agreement, so that a presence of an error (e.g., in partitioning input values into equivalence classes or in the program (e.g., a source code bug) can be detected.

It should be appreciated, that each result entry is produced as an output of the program using an entire secondary covering array is input into the program. Therefore, producing a plurality of result entries in a result vector includes providing a plurality of secondary covering arrays as input into the program. Moreover, producing a plurality of result vectors includes providing a plurality of secondary covering arrays that correspond to a plurality of primary vectors in a primary covering array.

Although vectors such as primary vectors have been shown as rows in primary covering arrays, primary vectors also can be arranged in columns. Moreover, secondary vectors can be arranged as columns instead of rows in a secondary covering array. A size (e.g., a number of rows or columns) of vectors (e.g., result vector, primary vector, secondary vector, and the like) is not limited. A size of arrays (e.g., primary covering array, secondary covering array, and the like) is not limited. In an embodiment, a size of the primary covering array can be m×n, wherein m (number of rows) and n (number of columns) are integers that are greater than zero and can be different or the same as one another. According to an embodiment, the size of the primary covering array can be given by the number of variables, equivalence classes, or combination thereof.

In an embodiment, a process for testing a program includes receiving a variable including a plurality of input values; producing a plurality of equivalence classes for the input values; producing a representative value per equivalence class; producing, by a processor, a primary covering array including a plurality of primary vectors; producing a secondary covering array including a plurality of secondary vectors; providing the secondary vectors to the program; and producing a result vector including a plurality of result entries to test the program.

The process further can include partitioning the input values for the variable. In some embodiments, the process includes determining whether the result entries of the result vector are self-consistent, determining whether partitioning the input values correctly produced the equivalence classes, or a combination thereof.

In a particular embodiment, wherein partitioning the input values correctly produced the equivalence classes, the process further includes producing an error message related to the program. According to an embodiment, the process includes re-partitioning the input data and creating a plurality of second equivalence classes that are different from the equivalence classes and iterating previous steps to test the program.

In a particular embodiment, wherein partitioning the input values incorrectly produced the equivalence classes, the process further includes producing an error message related to the equivalence classes.

The process includes providing the secondary covering array to the program; and producing, by the program, a result array, which is based on the secondary covering array.

In an embodiment, the primary vector includes a primary entry that includes the equivalence class. The primary covering array can include an n-way cover of the variable, based on the equivalence classes in the primary entries, wherein n is an integer from 1 to a total number of primary entries in the primary vector. The secondary vector can include a secondary entry that includes the representative value. Moreover, the secondary covering array can include an m-way cover of the primary vector, based on the representative values in the secondary entries, wherein m is an integer from 1 to a total number of secondary entries in the secondary vector. Here, the representative value is within a domain of the equivalence class, wherein at least one secondary covering array is produced per primary vector of the primary covering array, and at least one result vector is produced per secondary vector of the secondary covering array.

It is contemplated that the process is performed in an absence of a test oracle.

The variables received by the process can be passed to the process as a set of input values, conditions on the input values, an analytic expression for the input values, configuration settings, header file variables, macro-defined variables, and the like. In an embodiment, the variables are provided as names. It is contemplated that input values can be produced in view of the variables or can be provided explicitly. In some embodiments, all of input values are provided to the process. In a particular embodiment, an input value is absent from the input values but can be generated as a representative value and included in the secondary covering array.

In an embodiment, partitioning the input values of the variable includes establishing a break point at a condition defined within the specification such as comparisons (e.g., greater than (>), less than (<), greater than or equal to (≥), and the like) or set inclusion, or other condition within a decision point in the specification.

In an embodiment, producing the equivalence classes for the variable includes producing a smaller set of values that are adequate to test the program using the primary covering array and the second covering array. Producing the equivalence classes includes dividing input values into partitions that are meaningful for the program being tested (e.g., based on a categorization, grouping, and the like). An input value is selected for each partition. The input space of the variables are partitioned such that any input value selected from the partition to be a representative value in the secondary covering array affects the program under test in the same way as any other input value in the partitioned input values that may be selected. Thus, if a test case contains a parameter x that has value y, replacing y with any other value from the partition will not affect the test case result. Equivalence classes and their portioned input values can be labeled as $C_{i,j,k}$, wherein i indexes variables, j indexes classes, and k indexes values for variable $C_i$, class j.

In an embodiment, selecting the representative value of the equivalence class includes boundary value analysis, to select test values at each boundary and at the smallest possible unit on either side of the boundary, for three values per boundary. Alternative methods of determining representative values are possible. It is not essential that three values per boundary be used.

In an embodiment, producing the primary covering array includes specifying factors and levels, wherein factors are variables; and levels are input values for variables without equivalence classes, and equivalence class designations $C_{i,j}$ for variables with equivalence classes.

In an embodiment, producing the secondary covering array includes: (for each row of the primary covering array) computing a secondary covering array of the factors that are variables with equivalence classes, where levels for each factor $C_{i,j}$ are the values $C_{i,j,k}$ of that class. This also includes, for each row in the secondary array, substituting its values for the equivalence classes $C_{i,j}$ in the row from the primary covering array. If the primary covering array has M rows, and each secondary covering array has N rows, then a full test array with M×N rows can be created. If classes do not all have the same number of values in each, secondary covering arrays can vary in number of rows. In some embodiments, equivalence classes have the same number of values.

In an embodiment, producing the result vector includes executing each of the tests in each secondary test array in blocks of N tests, corresponding to the secondary covering array generated for each row of the primary covering array.

According to an embodiment, determining whether the result entries of the result vector are self-consistent includes verifying that output for each of the N tests in a block matches according to a predicate specified for the output. Results can be defined and differentiated by some predicate, which can be a single value or different value. A range of values for the variable can be specified in a particular output predicate.

In an embodiment, the result entries of the result vector are self-consistent. Accordingly, the equivalence classes corresponding to the secondary result vector subjected to testing the program are produced correctly, and the program is free of an error.

In an embodiment, the result entries of the result vector are not self-consistent. Accordingly, an error is present for producing the equivalence classes, in the program, or accommodation thereof. Determining whether partitioning the input values correctly produced the equivalence classes includes comparing input values or consistency with predicates that define equivalence classes. According to an embodiment, partitioning the input values incorrectly produced the equivalence classes, and the process includes producing an error message related to the equivalence classes. Exemplary error messages related to the error in producing the equivalence classes include indication that values produced for the secondary covering array results entries are not equivalent either as variable values or as equivalence is defined by an equivalence predicate. It is contemplated that, in response to determining that the equivalence classes were produced incorrectly, new equivalence classes are established after review of the source code or specification. According to an embodiment, partitioning the input values correctly produced the equivalence classes, and the process includes producing an error message related to the program. Exemplary error messages related to the error in the program include notification that results for inputs from a given secondary array are not equivalent. It is contemplated that, in response to determining that the program includes the error, equivalence class definitions are checked for correctness and if incorrect, are revised; and if correct, then the program is checked for coding errors.

Errors in producing the equivalence class can include wrong partitioning of the values, and the like.

Errors with the program can include incorrect coding or incorrect logic that does not match the program specification or an interaction fault that occurs when some values of one combine with certain other values.

The process, computer system, and computer program herein have numerous advantages and benefits. Comparing the result of testing the program with representative values in the secondary covering arrays can produce result vectors that are an effective verification of the program. If result entries are not self-consistent, equivalence classes have not been defined correctly and can be re-produced before developing a unit test, or a coding error is discovered. Combinatorial methods involved in the process provide efficient testing of the program. The process provides a check on correctness, detecting a significant class of faults, and can be automated and suitable to incorporate into a development environment. Checking result entries of the result vector for self-consistency can be referred to as equivalence class value match testing or simply match testing.

Additional beneficial properties of the process include test automation, test cost reduction, reducing or eliminating need for human insight in test definition, test oracle creation, or test result review. One beneficial property is that the process includes using a two-layer arrangement of covering arrays that involves a primary covering array (as a first layer) and a secondary covering array (as a second layer). Here, a primary entry of a primary vector in the primary covering array represents an equivalence class. The secondary covering array for equivalence classes in the primary covering array are produced with representative values included as secondary entries in secondary vectors. As a result, the process detects a class of errors in an absence of a test oracle. It is contemplated that the primary covering array is an n-way cover of the variable, based on the equivalence classes in the primary entries, wherein n is an integer from 1 to a total number of primary entries in the primary vector. It is further contemplated that the secondary covering array includes an m-way cover of the primary vector, based on the representative values in the secondary entries, wherein m is an integer from 1 to a total number of secondary entries in the secondary vector. Moreover, the representative value is within a domain of the equivalence class, wherein at least one secondary covering array is produced per primary vector of the primary covering array, and at least one result vector is produced per secondary vector of the secondary covering array.

Further, in testing the program with the primary covering array and the secondary covering array, predicates are used to define equivalent values for results where integer, real, or other individual values are not returned. Exemplary predicates include testing for set inclusion or exclusion, program error condition returned or not returned, comparison of complex data structure such as binary trees, linked lists, or other structures. Although predicates can be used, the process successfully tests the program when a faulty predicate maps elements of a single equivalence class to a plurality of different result entries. Source code for the program can be provided, but the process can be used in an absence of the source code when specifications are provided such that identification of equivalence classes can be accomplished. In an embodiment, the process is applied to testing a system. In a certain embodiment, the process is used for testing a unit of a larger system. Advantageously, testing a unit involves more rigorously defined equivalence classes as compared to larger systems.

Beneficially, a time or cost of testing the program using the primary covering array and the secondary covering is efficient because an oracle is not used. In some embodiments, an oracle can be provided or produced and incorporated in testing the program. Conventional testing using a single covering array would require producing a test oracle.

The process has numerous uses, including testing computer software or a condition that includes a complex condition or decision in an environment such as process control, avionics, consumer electronics, and the like. In a certain embodiment, the process includes verifying equivalence classes for testing a module or unit. The process can be included in computer system, computer program product, and the like.

In an embodiment, a computer system for testing a program includes: a memory; and a processor, in communications with the memory, wherein the computer system is configured to perform: receiving a variable including a plurality of input values; producing a plurality of equivalence classes for the input values; producing a representative value per equivalence class; producing, by the processor, a primary covering array, including a plurality of primary vectors; producing a secondary covering array, including a plurality of secondary vectors; providing the secondary vectors to the program; and producing a result vector including a plurality of result entries to test the program.

According to an embodiment, a computer program product for testing a program includes: a non-transitory computer readable storage medium readable by a processor and storing program code for execution by the processor to perform a process including: receiving a variable including a plurality of input values; producing a plurality of equivalence classes for the input values; producing a representative value for the per equivalence classes; producing, by the processor, a primary covering array, including a plurality of primary vectors; producing a secondary covering array, including a plurality of secondary vectors; providing the secondary vectors to the program; and producing a result vector including a plurality of result entries to test the program.

The articles and processes herein are illustrated further by the following Examples, which are non-limiting.

EXAMPLES

Example 1. Testing a Control System for a Building Lock

In this Example, a door on a building provides physical access to the building. The door includes a lock controlled by a control system. The control system unlocks the lock and provides a user access to the building based on a number of variables that are used to establish rules to determine if the user can have access to the building.

Accordingly, variables for the control system include: whether the user is an employee ("emp," a Boolean type with input values {0, 1}); day of week ("day," an integer type with input values from 1 to 7, wherein each day of the week is assigned an integer starting with Sunday being assigned an integer value of 1, Monday an integer value of 2, . . . , Saturday an integer value of 7); time of day ("time," an integer type having input values from 0 to 1439, which is an integer number of minutes after midnight (rounded to the nearest minute); whether the user has a special privilege ("priv," a Boolean type with input values {0, 1}); and whether the user is an auditor ("aud," a Boolean type with input values {0, 1}). Equivalence classes are produced for certain variables, namely day and time. Representative values for each equivalence class are produced from the input values for the variables day and time. The variables, equivalence classes, and representative values are listed in Table 1.

TABLE 1

| Variable | Data type | Input values | Equivalence class | Partitioned values | Representative values |
|---|---|---|---|---|---|
| Emp | Boolean | 0, 1 | N/A | N/A | N/A |
| Day | Integer | 1 . . . 7 | D1 | 1, 7 | 1, 7 |
|  |  |  | D2 | 2, . . . , 6 | 2, 6 |
| Time | Integer | 0 . . . 1439 | T1 | 0, . . . , 539 | 0, 539 |
|  |  |  | T2 | 540, . . . , 1020 | 540, 1020 |
|  |  |  | T3 | 1021, . . . , 1439 | 1021, 1439 |
| Priv | Boolean | 0, 1 | N/A | N/A | N/A |
| Aud | Boolean | 0, 1 | N/A | N/A | N/A |

With regard to the control system, access is permitted (i.e., the lock is unlocked by the control system) to the user by the control system if:
(1) the user is an employee;
   the time of day is during working hours; and
   the day of the week is a weekday;
(2) the user is an employee with administrative privileges; or
(3) the user is an auditor; and
   the day of the week is a weekday.

Partitioning of the input values of the variables to produce equivalence classes can be accomplished using heuristics commonly used in testing software. Using boundary values of the input values as representative values for the equivalence classes can be effective. Include mid-range values of the partitioned values for representative values in the equivalence classes can be useful if the equivalence class represents a continuous-valued variable or and ordered set of input values. If the partitioned values of input values of the equivalence class are an unordered set, representative values of the equivalence class to be used to test the control system can be selected at random or according to an application-specific heuristic, such as the operational profile of the control system.

Figure 23:
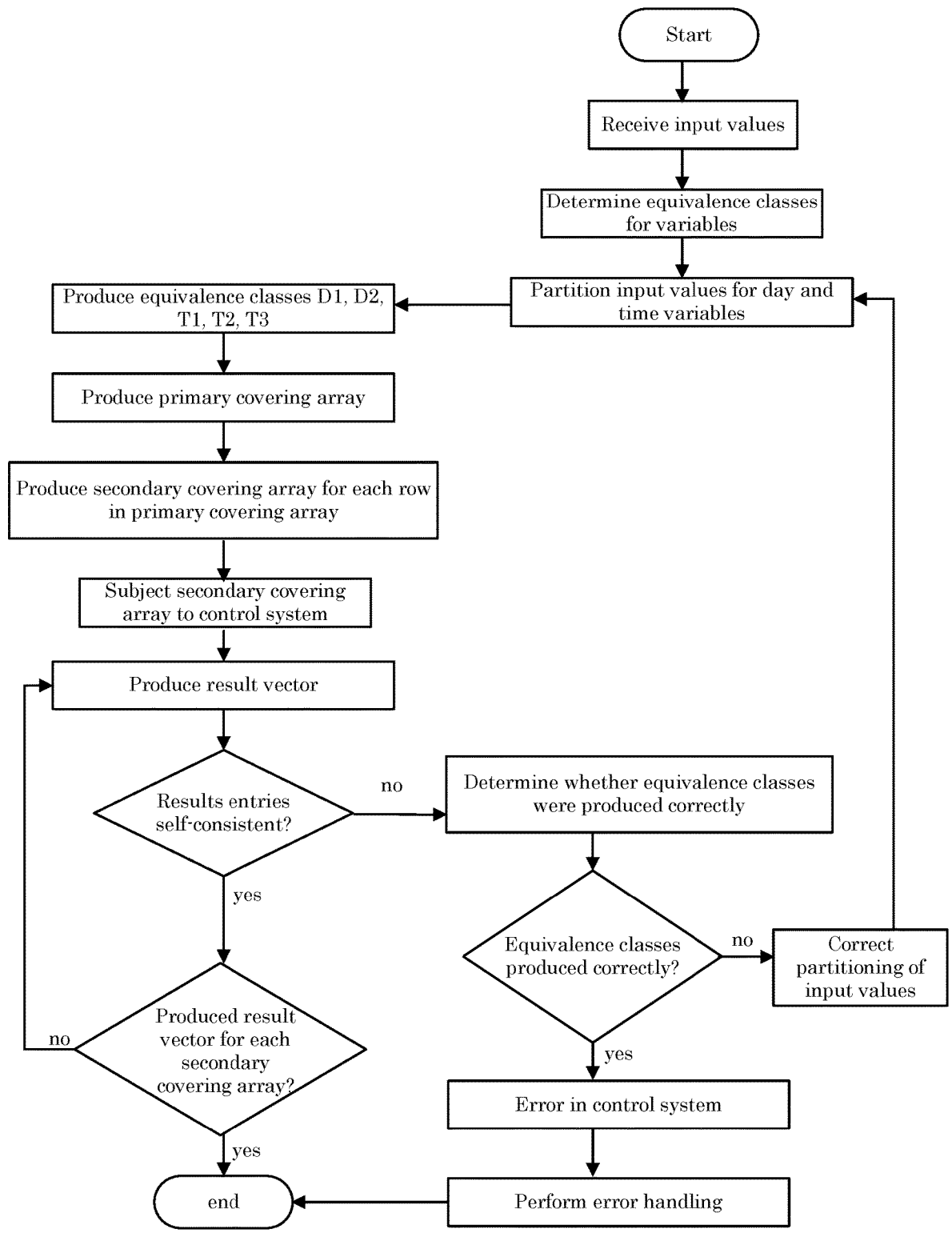
FIG. 23 shows a flowchart for testing a control system according to Example 1.

Exemplary source code for the control system is shown in FIG. 22. The process for testing the control system using a primary covering array and secondary covering array is shown in FIG. 23. Errors in the code for the control system are introduced into versions of the control system by changing relational operators in function access_chk( ) shown in FIG. 22.

The input values for the variables are partitioned into partitioned values as shown in Table 1 and equivalence classes are produced based on the partitioned values of the input values. A primary covering array was produced with pairwise coverage of the equivalence classes for the variables day and time as shown immediately below.

$$\begin{vmatrix} 0 & D2 & T1 & 1 & 1 \\ 1 & D1 & T1 & 0 & 0 \\ 0 & D1 & T2 & 1 & 0 \\ 1 & D2 & T2 & 0 & 1 \\ 0 & D1 & T3 & 0 & 1 \\ 1 & D2 & T3 & 1 & 0 \end{vmatrix}$$

Secondary covering arrays were produced for each primary vector (row) of the primary covering array, wherein used as secondary entries for the equivalence classes in the secondary covering arrays. An exemplary secondary covering array to implement pairwise tests for the first primary vector (top row: [0, D2, T1, 0, 0]) of the primary covering array is shown immediately below.

$$\begin{vmatrix} 0 & 2 & 0 & 1 & 1 \\ 0 & 6 & 0 & 1 & 1 \\ 0 & 2 & 539 & 1 & 1 \\ 0 & 6 & 539 & 1 & 1 \end{vmatrix}$$

With reference to FIG. 22, different results for function access_chk( ) of the code of the control system have a result value of 1, 2, and 3. Here, each row of the secondary covering array will produce a result entry in a result vector is at output from testing the control system. As noted above, in reality results would be defined and differentiated by some predicate, not necessarily a single possible value. For instance, in the control system, decision 3 might be recognized by system effects such as the appearance of an auditor role in the system log file. It is also possible that a range of input values for more than one variable can be specified in a particular output predicate.

If equivalence classes were produced correctly, and no error is present in the code, then result entries in a result vector for a secondary covering array should be the same (as defined by some predicate). For the code of the control system shown in FIG. 22, result vectors are shown in the result array immediately below, wherein each row is a result vector corresponding to a secondary covering array, which was produced per row for the primary covering array.

$$\begin{vmatrix} 3 & 3 & 3 & 3 \\ 0 & 0 & 0 & 0 \\ 0 & 0 & 0 & 0 \\ 1 & 1 & 1 & 1 \\ 0 & 0 & 0 & 0 \\ 2 & 2 & 2 & 2 \end{vmatrix}$$

That is, each row corresponds to one row of the primary covering array, and each result entry in a given row gives the output from the program for one of the secondary array tested by the control system and generated for the corresponding primary array row. Here, for the code shown in FIG. 22, all values are identical for a given row. Because the equivalence classes have been defined correctly and the code is correct, equivalent values produce the same results.

Tests were performed by using the same primary covering arrays in secondary covering arrays on code for the control system in which lines of the access_chk function were altered to become incorrect, that is, error was introduced into the code for the control system. In one test of the control system having errors in its code, "t<=END" was replaced with "t==END" in the code shown in FIG. 22 so that the code included the error: "if (emp && t>=START && t==END && d>=MON && d<=FRI) return 1." Subjecting the secondary covering arrays to the control system with the error produced the result array shown immediately below $$\begin{vmatrix} 3 & 3 & 3 & 3 \\ 0 & 0 & 0 & 0 \\ 0 & 0 & 0 & 0 \\ 3 & 3 & 1 & 1 \\ 0 & 0 & 0 & 0 \\ 2 & 2 & 2 & 2 \end{vmatrix}$$

wherein result entries in the fourth result vector shown in the fourth row of the result array. Here, the representative values of the equivalence classes for time no longer produced the same result. In this manner, the process for testing the control system detected an error in the code.

An additional set of 10 mutated programs were generated with the fault detection results as shown in Table 2.

TABLE 2

| Version | Mutated Code | Fault detected |
|---|---|---|
| 1 | (emp && t > START && t <= END && d >= MON && d <= FRI) | YES |
| 2 | (emp && t >= START && t == END && d >= MON && d <= FRI) | YES |
| 3 | (emp && t >= START && t <= END && d >= MON && d < FRI) | YES |
| 4 | (emp && t >= START && t <= END && d > MON && d <= FRI) | YES |
| 5 | (aud && d >= MON && d < FRI) | YES |
| 6 | (emp && t >= START || t <= END && d >= MON && d <= FRI) | NO |
| 7 | (emp && t >= START && t <= END || d >= MON && d <= FRI) | NO |
| 8 | (emp && t >= START && t <= END || d >= MON || d <= FRI) | YES |
| 9 | (aud && d >= MON || d <= FRI) | YES |
| 10 | (aud && d <= MON || d <= FRI) | YES |

Example 2. Testing a Program for Process Control of a Camera

A camera system includes a camera, speed sensor, light sensor, and other environment sensors and is integrated into an environment such as a vehicle. A controller (e.g., an integrated circuit) determines an aperture setting or shutter speed of the camera based on input values of variables that include, e.g., a current speed of the vehicle ("Vspeed"), a lighting condition ("Light"), digital media sensitivity ("Sens") (such as film speed equivalent in ISO numbers), and the like. Here, Vspeed can be reported in units of miles per hour (mph), and input values for Vspeed can be measured in increments of 0.1 mph. Light can be reported in units of lux, and input values for Light can be measured in increments of 0.1 lux. Sens. can be reported in an ISO equivalent as defined in international standard ISO 12232: 2006, which determines an equivalence between electronic sensors and film speed.

Equivalence classes and representative values for the input values of the variables (Vspeed, Light, Sens.) are shown respectively in Table 3 for Vspeed, Table 4 for Light, and Table 5 Sens.

TABLE 3

| Equivalence class (for Vspeed) | Representative values (mph) |
|---|---|
| V1 | 0, 5, 10 |
| V2 | 10.1, 30 |
| V3 | 30.1, 45, 60 |

TABLE 4

| Equivalence class (for Light) | Representative values (lux) |
|---|---|
| L1 | 0, 0.1, 3 |
| L2 | 3.1, 100 |
| L3 | 100.1, 1000 |
| L4 | 1000.1, 50000 |

TABLE 5

| Equivalence class (for Sens.) | Representative values (ISO equivalent) |
|---|---|
| S1 | 50, 100 |
| S2 | 200, 400 |

In testing the camera control program, these equivalence classes can be combined with other configuration options in the camera system that can have a Boolean value, numerical value, or another enumerated value. Here, additional variables can be included such as various options for settings on the camera (e.g., resolution, number of pixels, and the like). We denote these as a first option (Opt1 with Boolean input values 0, 1), second option (Opt2 with Boolean input values 0, 1), and third option (Opt3 with numeric input values 0, 5, 10). Here, a primary covering array is produced using class names for the equivalence classes that include V1, V2, V3 (for Vspeed); L2, L3, L4 (for Light); and S1, S2 (for Sens.) as well as primary entries for Opt1, Opt2, and Opt3.

The primary array includes primary entries (in primary vectors) that can be grouped into columns for the variables (Vspeed, Light, Sens, Opt1, Opt2, Opt3), wherein equivalence class names are used as primary entries for Vspeed, Light, and Sens, and input values are used for Opt1, Opt2, and Opt3.

An exemplary primary array is $$\begin{bmatrix} V1 & L1 & S1 & 0 & 0 & 0 \\ V1 & L2 & S2 & 0 & 1 & 0 \\ & & \ldots & & & \\ V1 & L1 & S2 & 0 & 1 & 5 \\ & & \ldots & & & \end{bmatrix}.$$

The first row in the primary covering array is the first primary vector (i.e., [V1, L1, S1, 0, 0, 0]). The first primary vector is used to produce a secondary covering array that includes representative values for the equivalence classes (V1, L1, S1) shown in Table 3, Table 4, and Table 5. Accordingly, a 2-way secondary covering array of secondary vectors that include representative values for V1, L1, and S1 in the first three columns (and input values for Opt1, Opt2, and Opt3, respectively in the last three columns) is shown immediately below.

$$\begin{bmatrix} 0 & 0 & 100 & 0 & 0 & 0 \\ 0 & 0.1 & 50 & 0 & 0 & 0 \\ 0 & 3 & 100 & 0 & 0 & 0 \\ 5 & 0 & 50 & 0 & 0 & 0 \\ 5 & 0.1 & 100 & 0 & 0 & 0 \\ 5 & 3 & 50 & 0 & 0 & 0 \\ 10 & 0 & 100 & 0 & 0 & 0 \\ 10 & 0.1 & 50 & 0 & 0 & 0 \\ 10 & 3 & 100 & 0 & 0 & 0 \end{bmatrix}$$

A secondary array is produced for each row of the primary array.

The testing process includes comparing system response for each of the nine rows of a secondary covering array; checking that aperture setting responses are equivalent within a secondary array, and shutter speed setting responses are equivalent within a secondary array, as defined by equivalence predicate or values, for all rows of a secondary covering array; reporting differences; resolving differences either by revising equivalence classes or identifying errors in code or circuitry.

Example 3. Shipping Program Test

A program for shipping includes a module that determines shipping cost based on variables that include distance d and weight w. The input values for weight are partitioned into equivalence classes, wherein packages that weigh less than 1 pound are in a first weight class (W1); packages that weigh from 1 to 10 pounds are in a second weight class (W2), and packages that weigh greater than 10 pounds are in a third weight class (W3). The module includes a function f(d,w) such that f(d, 0.2)=f(d, 0.9) for equal values of d. For different equivalence classes of weight, f(d, 0.2) is different from f(d, 5.0) because two different weight classes (W1 and W2) are involved.

Tests are generated using the following program specifications:
  (1) If the shipping distance is not more than 100 miles, and the package weight is not more than five pounds, then the cost is $5.00 if no packaging is required or $10.00 if packaging is required;
  (2) If the shipping distance is not more than 100 miles, and the package weight is more than five pounds, then the cost is $15.00 if no packaging is required or $20.00 if packaging is required;
  (3) If the shipping distance is more than 100 miles, and the package weight is not more than five pounds, then the cost is $25.00 if no packaging is required or $30.00 if packaging is required; and
  (4) If the shipping distance is more than 100 miles, and the package weight is more than five pounds, then the cost is $35.00 if no packaging is required or $40.00 if packaging is required.

The primary covering array and secondary covering array are produced based on factors for the two equivalence classes and other variables as follows:
  dist: (0,99, 100), (101,1000), (1001, 9999)→classes A1, A2, A3;
  weight: (0, 5), (6, 8, 10)→classes B1, B2; and
  pkg: boolean.

Factors and levels used to generate the primary covering array are as follows:
  dist (enum): A1, A2, A3
  weight (enum): B1, B2
  pkg (boolean): 0,1.

Pairwise coverage is obtained with the following array:

$$\begin{bmatrix} 1 & A1 & B1 & 1 \\ 2 & A1 & B2 & 0 \\ 3 & A2 & B1 & 0 \\ 4 & A2 & B2 & 1 \\ 5 & A3 & B1 & 0 \\ 6 & A3 & B2 & 1 \end{bmatrix}$$

Secondary arrays are computed to implement pairwise tests for each row of the primary array, using covering arrays of the classes included in each row. Thus, the first row uses the following factors and levels to generate a covering array:
  A1 (enum): (0, 99, 100); and
  B1 (enum): (0, 5).

The covering array is combined with any constants from the primary array for each line. Thus, the first line of the primary covering array is expanded to the secondary covering array shown immediately below.

$$\begin{bmatrix} 0 & 0 & 1 \\ 0 & 5 & 1 \\ 99 & 0 & 1 \\ 99 & 5 & 1 \\ 100 & 0 & 1 \\ 100 & 5 & 1 \end{bmatrix}$$

Result Vectors are produced. If equivalence classes have been defined correctly, and there are no errors in the code, then results should be the same (as defined by some predicate) for each set of tests in the secondary array generated from one row of the primary array. Thus for the correct code, results are as follows for the secondary array above: [10 10 10 10 10 10].

The process is repeated for each row of the primary array, producing one result vector for each row of the primary array, containing one result value or structure for each row of the secondary array. Result vectors may contain values, data structures, or other program-produced objects.

Each row corresponds to one row of the primary covering array, and each column gives the result for one of the secondary array tests generated for the corresponding primary array row. All values are equivalent for columns of a given row, indicating that no error has been detected. If all values or structures in the result vector were not equivalent, then either the equivalence classes have not been defined correctly or there is an error in the code. The equivalence classes can be reviewed against the specification. If the equivalence classes were incorrectly defined, the classes are changed, and the primary and secondary array generation process repeated, followed by testing using the new arrays. If the classes were correctly defined, then the code can be inspected for errors.

Example 4. Testing Module for Traffic Collision Avoidance System (TCAS)

A module for a TCAS used in air traffic control systems is tested. The TCAS module code includes a set of 41 versions with seeded faults. Two-thirds of the faults are changes that include replacing a constant with another constant, replacing a conditional (e.g., ">=") with another conditional (e.g., ">"), or dropping a condition. The TCAS module has 12 variables that receive input values that specify parameters of two aircraft. The variables include speed, position, and an output variable. The process includes testing the module against the set of faulty versions to detect the faults.

Equivalence classes were produced for three of the variables and two separate sets of primary covering arrays with corresponding secondary covering arrays were produced that provided two-layer test covering arrays in 3-way×3-way and 4-way×3-way configuration. The number of tests and results are shown in Table 6.

TABLE 6

| Primary × secondary | Number of tests | Total number tests | Number of faults detected |
|---|---|---|---|
| 3-way × 3-way | 285 × 8 | 2280 | 6 |
| 4-way × 3-way | 970 × 8 | 7760 | 22 |

Although a large set of tests can be used, no test oracle is used in the process for testing for the module. Once equivalence classes have been defined, tests can be run in parallel if desired. Results are encouraging, as more than half of the 41 faults were detected with the second configuration. Because match testing can be fully automated, these faults could be detected without human effort required to develop test oracles.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 24:
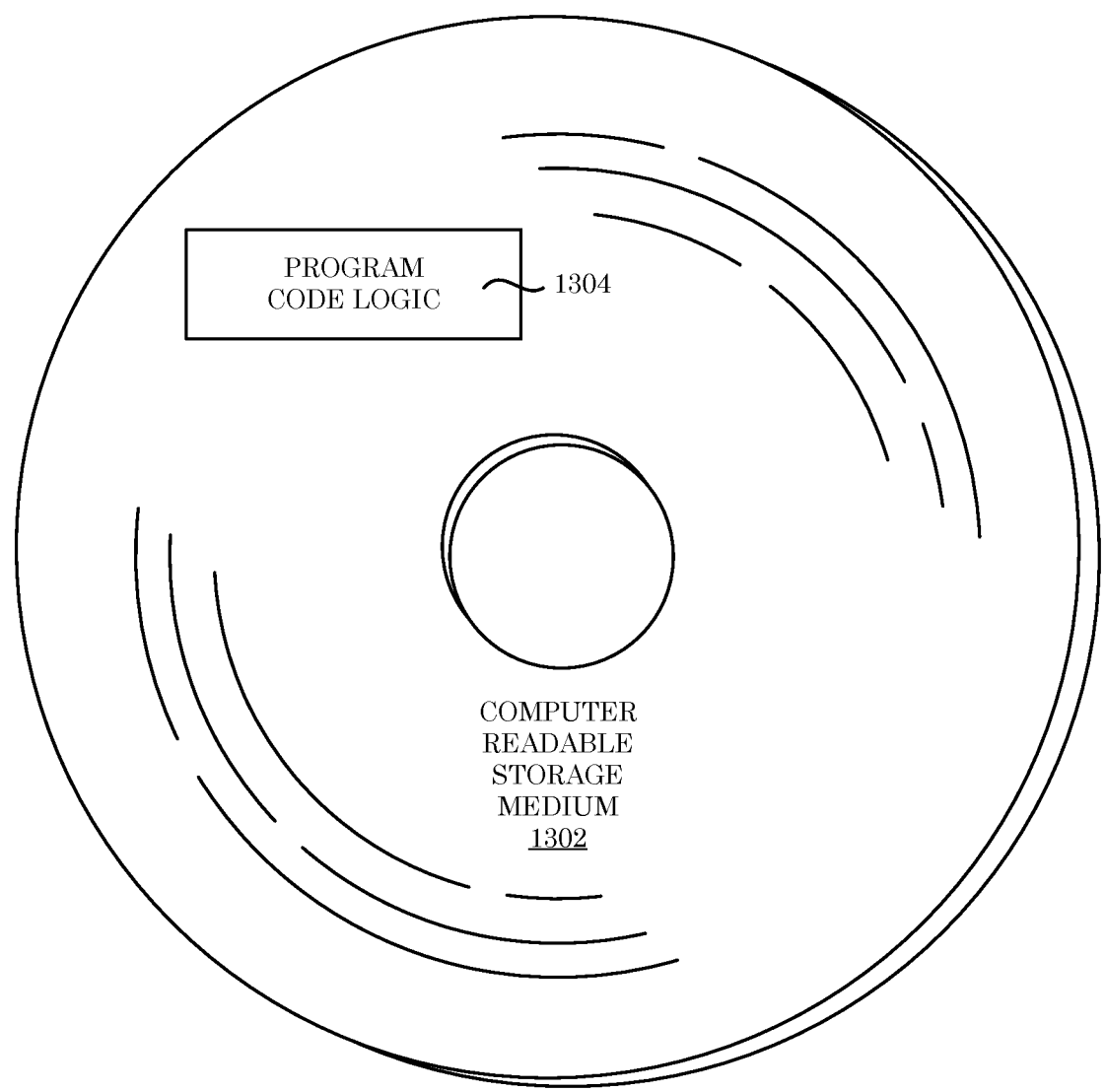
FIG. 24 shows a computer program product.

Referring now to FIG. 24, in an embodiment, a computer program product 1300 includes, e.g., a computer readable media 1302 to store computer readable program code or logic 1304 thereon to provide and facilitate one or more embodiments herein.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A process for testing a program, the process comprising:
   receiving a variable comprising a plurality of input values; producing a plurality of equivalence classes for the input values;
   producing a representative value per equivalence class;
   producing, by a processor, a primary covering array comprising a plurality of primary vectors, the primary covering array being an n-way cover of the variable and based on the equivalence classes, wherein n is an integer from 1 to a total number of entries in the primary vector;
   producing a secondary covering array comprising a plurality of secondary vectors, the secondary covering array being an m-way cover of the primary vectors, based on the representative value, wherein m is an integer from 1 to a total number of secondary entries in the secondary vector;
   providing the secondary vectors to the program; and
   producing a result vector comprising a plurality of result entries to test the program.

2. The process of claim 1, further comprising partitioning the input values for the variable.

3. The process of claim 2, further comprising determining whether the result entries of the result vector are self-consistent.

4. The process of claim 3, further comprising determining whether partitioning the input values correctly produced the equivalence classes.

5. The process of claim 4, wherein partitioning the input values correctly produced the equivalence classes, and the process further comprises producing an error message related to the program.

6. The process of claim 4, wherein partitioning the input values incorrectly produced the equivalence classes, and the process further comprises producing an error message related to the equivalence classes.

7. The process of claim 3, further comprising providing the secondary covering array to the program.

8. The process of claim 7, further comprising producing, by the program, a result array, which is based on the secondary covering array.

9. The process of claim 1, wherein the primary vector comprises a primary entry that comprises the equivalence class.

10. The process of claim 9, wherein the primary covering array comprises an n-way cover of the variable, based on the equivalence classes in the primary entries,
wherein n is an integer from 1 to a total number of primary entries in the primary vector.

11. The process of claim 10, wherein the secondary vector comprises a secondary entry that comprises the representative value.

12. The process of claim 11, wherein the secondary covering array comprises an m-way cover of the primary vector, based on the representative values in the secondary entries,
wherein m is an integer from 1 to a total number of secondary entries in the secondary vector.

13. The process of claim 12, wherein the representative value is within a domain of the equivalence class,
wherein at least one secondary covering array is produced per primary vector of the primary covering array, and
wherein at least one result vector is produced per secondary vector of the secondary covering array.

14. The process of claim 13, wherein the process is performed in an absence of a test oracle.

15. A computer system for testing a program, the computer system comprising:
a memory; and
a processor, in communication with the memory,
wherein the computer system is configured to perform:
receiving a variable comprising a plurality of input values;
producing a plurality of equivalence classes for the input values;
producing a representative value per equivalence class;
producing, by the processor, a primary covering array comprising a plurality of primary vectors, the primary covering array being an n-way cover of the variable and based on the equivalence classes, wherein n is an integer from 1 to a total number of entries in the primary vector;
producing a secondary covering array comprising a plurality of secondary vectors, the secondary covering array being an m-way cover of the primary vectors, based on the representative value, wherein m is an integer from 1 to a total number of secondary entries in the secondary vector;
providing the secondary vectors to the program; and
producing a result vector comprising a plurality of result entries to test the program.

16. The process of claim 15, further comprising determining whether the result entries of the result vector are self-consistent.

17. The process of claim 15, further comprising determining whether partitioning the input values correctly produced the equivalence classes.

18. A computer program product for testing a program, the computer program product comprising:
a non-transitory computer readable storage medium readable by a processor and storing program code for execution by the processor to perform a process comprising:
receiving a variable comprising a plurality of input values;
producing a plurality of equivalence classes for the input values;
producing a representative value per equivalence class;
producing, by a processor, a primary covering array comprising a plurality of primary vectors, the primary covering array being an n-way cover of the variable and based on the equivalence classes, wherein n is an integer from 1 to a total number of entries in the primary vector;
producing a secondary covering array comprising a plurality of secondary vectors, the secondary covering array being an m-way cover of the primary vectors, based on the representative value, wherein m is an integer from 1 to a total number of secondary entries in the secondary vector;
providing the secondary vectors to the program; and
producing a result vector comprising a plurality of result entries to test the program.

19. The process of claim 18, further comprising determining whether the result entries of the result vector are self-consistent.

20. The process of claim 18, further comprising determining whether partitioning the input values correctly produced the equivalence classes.

* * * * *